US012796660B2

(12) United States Patent
Lv et al.

(10) Patent No.: US 12,796,660 B2
(45) **Date of Patent: *Nov. 17, 2026**

(54) CONCRETE SETTLEMENT SUBSTRATE FOR OYSTER AND PREPARATION METHOD THEREOF, AND MARINE ECOLOGICAL ENGINEERING CONSTRUCTION METHOD

(71) Applicant: Jianfu Lv, Harbin (CN)

(72) Inventors: Jianfu Lv, Harbin (CN); Zhenzhen Cao, Harbin (CN); Mingjun Wang, Harbin (CN)

(73) Assignee: Jianfu LV, Harbin (CN)

( * ) Notice: Subject to any disclaimer, the term of this patent is extended or adjusted under 35 U.S.C. 154(b) by 865 days.

This patent is subject to a terminal disclaimer.

(21) Appl. No.: 17/831,313

(22) Filed: Jun. 2, 2022

(65) Prior Publication Data

US 2022/0312746 A1 Oct. 6, 2022

Related U.S. Application Data

(63) Continuation of application No. PCT/CN2020/133083, filed on Dec. 1, 2020.

(30) Foreign Application Priority Data

Dec. 2, 2019 (CN) ......................... 201911210403.8
Dec. 2, 2019 (CN) ......................... 201911210542.0

(51) Int. Cl.
*A01K 61/70* (2017.01)
*A01K 61/54* (2017.01)
(Continued)

(52) U.S. Cl.
CPC .............. *A01K 61/70* (2017.01); *A01K 61/54* (2017.01); *B28B 1/52* (2013.01); *B28B 11/245* (2013.01);
(Continued)

(58) Field of Classification Search
CPC ........ A01K 61/70; A01K 61/54; A01K 61/60; A01K 80/00; A01K 61/77; A01K 67/033;
(Continued)

(56) References Cited

U.S. PATENT DOCUMENTS 5,543,034 A * 8/1996 Hilbertz ................. A01K 61/50
204/DIG. 6
7,144,196 B1 * 12/2006 Campbell ............... E02B 3/046
119/221
(Continued)

FOREIGN PATENT DOCUMENTS

CN 109608112 A 4/2019
CN 110644422 A * 1/2020 ................ C02F 3/34
(Continued)

OTHER PUBLICATIONS

International Search Report of PCT/CN2020/133083 dated Mar. 3, 2021 with English translation, (6p).

*Primary Examiner* — Son T Nguyen
(74) *Attorney, Agent, or Firm* — Arch & Lake LLP; Hao Tan; Shen Wang

(57) ABSTRACT

Disclosed is settlement substrate for oyster technology, and, in particular, the present disclosure relates to a concrete settlement substrate for oyster and a preparation method thereof, and a construction method. The concrete settlement substrate for oyster has the characteristics of induction of rapid settlement and metamorphosis of sessile organisms thereto, promotion of long-term growth and good durability, and the oysters are settled on a surface of concrete. A reasonable spatial layout is utilized, such that each concrete pile (block) can effectively break waves and ensure smooth exchange between water bodies on two sides. After oysters settled to each concrete pile (block) breed a large amount,
(Continued)

the water bodies can be purified, and the ecological environment in the surrounding sea area can be improved.

12 Claims, 4 Drawing Sheets

(51) Int. Cl.

| | |
|---|---|
| ***B28B 1/52*** | (2006.01) |
| ***B28B 11/24*** | (2006.01) |
| ***C04B 14/28*** | (2006.01) |
| ***C04B 18/02*** | (2006.01) |
| ***C04B 18/18*** | (2006.01) |
| ***C04B 20/10*** | (2006.01) |
| ***C04B 22/14*** | (2006.01) |
| ***C04B 24/26*** | (2006.01) |
| ***C04B 28/04*** | (2006.01) |
| ***C04B 28/08*** | (2006.01) |
| *C04B 103/32* | (2006.01) |
| *C04B 103/54* | (2006.01) |
| *C04B 111/74* | (2006.01) |

(52) U.S. Cl.

CPC ............ *C04B 14/28* (2013.01); *C04B 18/027* (2013.01); *C04B 18/18* (2013.01); *C04B 20/1037* (2013.01); *C04B 22/142* (2013.01); *C04B 24/2641* (2013.01); *C04B 28/04* (2013.01); *C04B 28/08* (2013.01); *C04B 2103/32* (2013.01); *C04B 2103/54* (2013.01); *C04B 2111/74* (2013.01)

(58) Field of Classification Search

CPC ....... Y02A 10/26; Y02A 40/81; Y02W 30/91; C04B 14/28; C04B 2111/24; C04B 18/18; C04B 24/2641; C04B 24/42; C04B 7/02; C04B 14/16; C04B 2103/32; C04B 2103/54; C04B 18/027; C04B 20/1037; C04B 22/142; C04B 28/04; C04B 28/08; C04B 2111/74; B28B 1/52; B28B 11/245

See application file for complete search history.

(56) References Cited

U.S. PATENT DOCUMENTS

| | | | | |
|---|---|---|---|---|
| 2004/0065266 | A1* | 4/2004 | Fernandez | A01K 61/70 119/221 |
| 2009/0194217 | A1* | 8/2009 | Filbert | A01K 61/70 156/61 |
| 2011/0015306 | A1* | 1/2011 | Turpin, Jr. | C04B 22/085 106/816 |
| 2013/0152827 | A1* | 6/2013 | Ripandelli | C09C 1/24 106/806 |
| 2014/0264140 | A1* | 9/2014 | Gong | C04B 28/006 106/676 |
| 2015/0366170 | A1* | 12/2015 | Finkel | A01K 61/00 47/1.01 R |
| 2016/0135435 | A1* | 5/2016 | Manning | A01K 61/70 106/639 |
| 2021/0130236 | A1* | 5/2021 | Rahman | C04B 14/047 |

FOREIGN PATENT DOCUMENTS

| | | | | | |
|---|---|---|---|---|---|
| CN | 110754401 | A | * | 2/2020 | A01K 61/17 |
| CN | 111264427 | A | | 6/2020 | |
| CN | 111268961 | A | | 6/2020 | |
| FR | 3146675 | A1 | * | 9/2024 | E02B 3/046 |
| JP | 200041525 | A | | 2/2000 | |
| KR | 100466438 | B1 | * | 1/2005 | A01K 61/70 |
| KR | 100508207 | B1 | * | 8/2005 | C04B 22/148 |
| KR | 20110112914 | A | * | 10/2011 | A01K 61/70 |
| KR | 101436316 | B1 | | 9/2014 | |
| KR | 20180020021 | A | * | 2/2018 | C04B 14/361 |
| WO | WO-9849893 | A1 | * | 11/1998 | A01K 63/006 |
| WO | WO-2014015289 | A1 | * | 1/2014 | C04B 28/02 |
| WO | WO-2014141224 | A2 | * | 9/2014 | E02B 3/046 |
| WO | WO-2015175975 | A1 | * | 11/2015 | A01K 61/54 |
| WO | WO-2016144786 | A1 | * | 9/2016 | A01K 61/54 |
| WO | WO-2019204776 | A1 | * | 10/2019 | C04B 40/0675 |
| WO | WO-2022203901 | A1 | * | 9/2022 | C04B 28/02 |

* cited by examiner

Sulfate cement concrete

Silica fume cement

CONCRETE SETTLEMENT SUBSTRATE FOR OYSTER AND PREPARATION METHOD THEREOF, AND MARINE ECOLOGICAL ENGINEERING CONSTRUCTION METHOD

CROSS-REFERENCE TO RELATED APPLICATIONS

This application is a continuation of a PCT application PCT/CN2020/133083 filed on Dec. 1, 2020, which claims the benefit of a Chinese patent application 201911210542.0 filed on Dec. 2, 2019, and a Chinese patent application 201911210403.8 filed on Dec. 2, 2019, and the entire disclosures of which are incorporated by reference in this application for all purposes.

TECHNICAL FIELD

The present disclosure relates to an oyster settlement substrate technology and a marine ecological engineering construction technology, particularly relates to a concrete settlement substrate for oyster and a preparation method thereof, and a marine ecological engineering construction method, which belongs to the cross-field of marine sessile organisms and concrete.

BACKGROUND

With the improvement of the living standard of people, the consumption demands for oysters serving as healthy food on dining tables is increasing. A traditional small-scale culture method cannot meet the growing demand for oyster. Meanwhile, with the increase of the amount of oyster reef restoration and the coming of oyster reef-like marine ecological engineering construction, the demand for an oyster settlement substrate is increasing. Common culture methods include bamboo inserting culture, bottom culture, strip stone and vertical stone culture, hanging drop culture and the like, but there is the problem that oysters need a long time to reach a satisfactory settlement rate on the settlement substrate. In addition, due to the increase of the culture amount of oysters, the oyster settlement substrate such as shells of *Azumapecten farreri* cannot meet the needs of oyster larvae culture, which leads to an increase in the price of oyster settlement substrate of shells. Moreover, in the CN106719186 patent invented by Ocean University of China recently, a novel oyster settlement substrate is prepared by adding 15%-20% shell powder (by weight of cement paste) and 5-15% shell fragments. Due to the addition of oyster shell fragments, the surface of the settlement substrate becomes rougher, which increases the number of settled oysters. Compared with a method using *Azumapecten farreri*, this method is more convenient to collect oyster larvae, and the settlement effect of oyster larvae is better. However, the water consumption control conducted through a water reducing agent and the curing are not considered, and the water-cement ratio and curing determine the permeability of concrete. A large amount of alkali contained in the settlement substrate can be released, consequently, the alkalinity of seawater making contact with the settlement substrate is increased, and settlement of marine sessile organism larvae is restrained. Especially when larvae are cultured in a larva culture pond, the situation that the pH value of water is increased due to the small water mass, and consequently the oyster larvae die is likely to happen. Meanwhile, due to the fact that a large amount of shell powder is added, the color of a cement settlement substrate becomes light from dark gray, and settlement of the oysters is not facilitated.

SUMMARY

An objective of the present disclosure is to provide a lightweight concrete settlement substrate which is able to induce sessile organisms to rapidly and compactly settle to the concrete surface and has good durability, aiming at solving the problems that at present, due to the fact that water consumption control and curing (the water-cement ratio and curing determine the permeability of concrete) are not carried out, thus a large amount of alkali contained in the settlement substrate is released, the alkalinity of seawater making contact with the settlement substrate is increased, settlement of marine sessile organism larvae is restrained, and meanwhile, due to the fact that a large amount of shell powder is added, the color of a concrete settlement substrate becomes light from dark gray, and settlement of oysters is not facilitated.

The objective of the present disclosure is realized as follows: the cement dosage in the settlement substrate is reduced, a proper cement type is selected, and a proper mineral admixture is added to obtain cement with lower alkalinity. Meanwhile, the water-cement ratio of the concrete of the settlement substrate is controlled, and the release rate of the concrete is controlled. According to the color preferred by settled oysters and the addition of biological calcium, calcium carbonate and trace elements, the early settlement, metamorphosis and later growth of the oysters are promoted. Meanwhile, the configuration design of the settlement substrate is carried out. In addition, the settlement substrate can be directly used for sessile organism larvae in the culture pond and does not need to be placed in seawater for a long time. Under the condition of no violent collision or smashing, the expected service life of the settlement substrate can be at least 50 years.

The weight of the concrete settlement substrate can be reduced by using light weight aggregate concrete, and the costs of transportation, labor and the like can be reduced in the processes of preparation, transportation and maintenance of samples. The labor cost of fishermen moving the settlement substrate and harvesting the oysters can be reduced or the costs of transportation, fixing and the like can be reduced during sea farming. The risk of breaking due to careless falling onto the ground during use can be reduced.

The strength, especially the tensile strength, of the concrete can be reinforced by incorporating fibers. In the present disclosure, alkali-resistant fibers are combined with the concrete with ecological properties, so that the crack resistance, bending resistance and fatigue resistance of the concrete are enhanced. The early cracking of the concrete applied to breakwater members can be reduced, the damage rate of the members in the processes of transportation and seaside fixing can be reduced, and especially the capacity of resisting extreme loads such as typhoon can be improved.

The present disclosure further comprises the following structural characteristics:

The concrete settlement substrate for oyster is prepared from the following material components in percentage by weight: 21.8-34.5% of a cementitious material, 24.6-37.5% of lightweight coarse aggregate, 15.8-29.6% of lightweight fine aggregate, 8.4-16.4% of water, 0.6-3.0% of a dark pigment, 0.4-2.0% of biological calcium powder, 0.4-2.0% of calcium carbonate powder, 0.2-1.8% of trace elements, 0.15-1.5% of chopped fibers and 0.03-0.18% of a superplasticizer.

Figure 8:
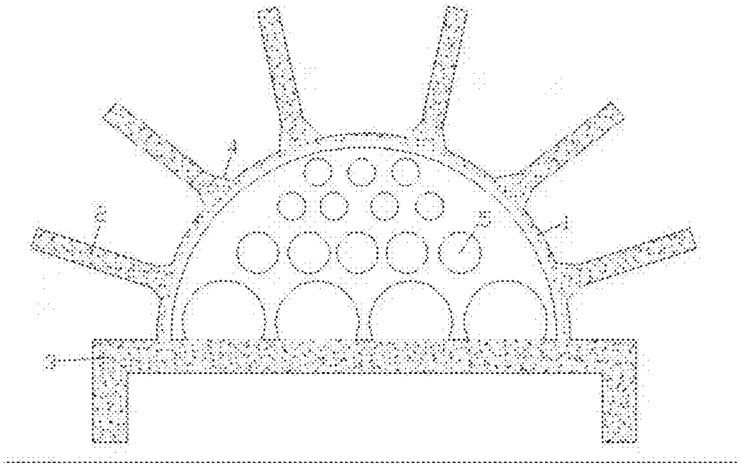
FIG. 8 is a design picture of a bionic concrete member.

Wherein in FIG. 8, 1—concrete thin shell with a thickness about 5 cm; 2—strip-shaped columnar antenna with a length about 1.5 m; 3—thin shell structure base; 4—columnar connecting and reinforcing area; and 5-through holes with different diameters.

DETAILED DESCRIPTION OF EMBODIMENTS

The present disclosure will be described in further detail below with reference to the accompanying drawings and specific examples.

Figure 5:
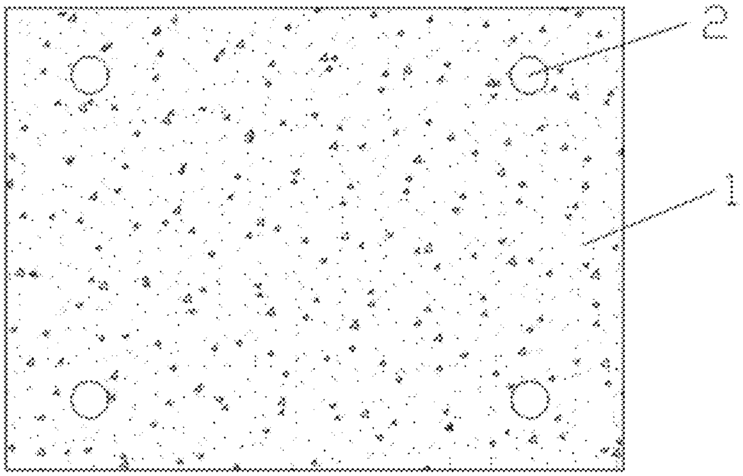
FIG. 5 is a picture of a concrete settlement substrate for oyster.
Figure 6:
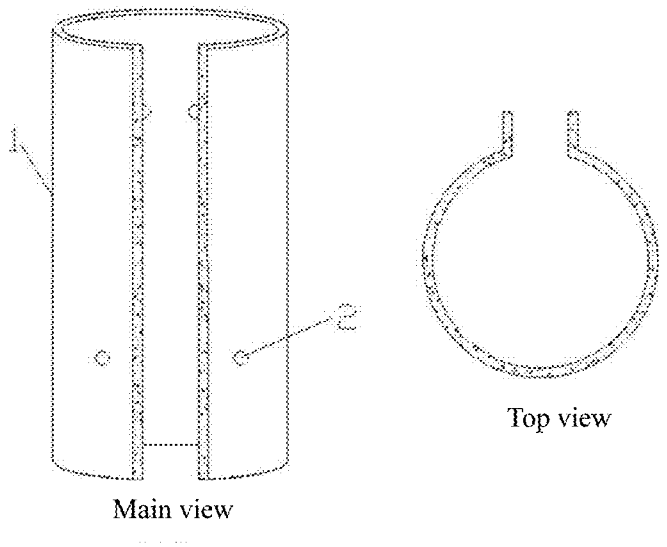
FIG. 6 is a picture of a concrete settlement substrate for oyster.
Figure 7:
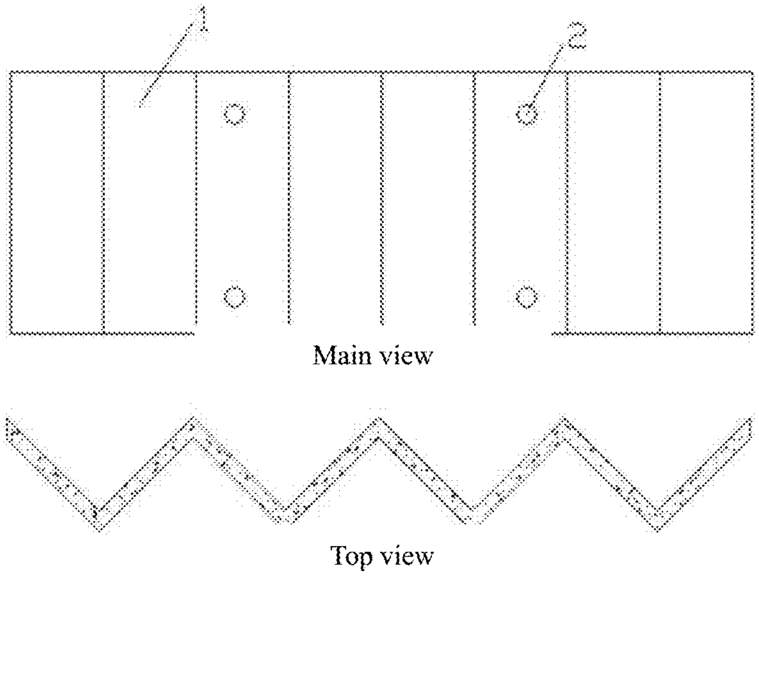
FIG. 7 is a picture of a concrete settlement substrate for oyster.

These examples are only used to illustrate the present disclosure and did not limit the scope of the present disclosure. Examples 1 to 21 had the same implementation methods, and the concrete mix is as shown in the following examples. The present disclosure used the above concrete to design concrete settlement substrates of different shapes for oyster, as shown in FIGS. 5-7.

Example 1: According to the concrete mix of ordinary Portland cement, the mix ratios by weight of ordinary Portland cement, lightweight coarse aggregate, lightweight fine aggregate, water and polycarboxylate superplasticizer powder are 29.37%, 33.53%, 24.48%, 12.59% and 0.03% in a sequence.

Wherein the lightweight coarse aggregate is one or two of crushed lightweight porous basalt and lightweight ceramsite of which the maximum particle size is less than 20 mm. The lightweight fine aggregate is one or two of crushed zeolite and lightweight ceramic sand, had the particle size of 0.2 to 5 mm and is well graded. The water should meet the concrete water standard (JGJ63-2006), the Cl− content is less than 1,000 mg/L, the pH value is more than 4.5, and the influence on the initial setting time, final setting time, strength and permeability of cement is small. In the Examples 1 to 21, the above materials are the same.

Example 2: According to the reference concrete mix, the mix ratios by weight of ordinary Portland cement, silica fume, blast furnace slag powder, lightweight coarse aggregate, lightweight fine aggregate, water and polycarboxylate superplasticizer powder are 17.62%, 1.47%, 10.28%, 33.53%, 24.48%, 12.59% and 0.03% in a sequence.

Example 3: The mix ratios by weight of an unmodified dark pigment, ordinary Portland cement, silica fume, blast furnace slag powder, lightweight coarse aggregate, lightweight fine aggregate, water and polycarboxylate superplasticizer powder are 1.47%, 17.62%, 1.29%, 8.99%, 33.53%, 24.48%, 12.59% and 0.03% in a sequence.

Example 4: The mix ratios by weight of a modified dark pigment (the mass ratio of iron oxide black to an aniline black mixture is 1:1), ordinary Portland cement, silica fume, blast furnace slag powder, lightweight coarse aggregate, lightweight fine aggregate, water and polycarboxylate superplasticizer powder are 0.87%, 17.62%, 1.36%, 9.52%, 33.53%, 24.48%, 12.59% and 0.03% in a sequence.

Example 5: The mix ratios by weight of a modified dark pigment (the mass ratio of iron oxide black to an aniline black mixture is 1:1), ordinary Portland cement, silica fume, blast furnace slag powder, lightweight coarse aggregate, lightweight fine aggregate, water and polycarboxylate superplasticizer powder are 1.47%, 17.62%, 1.29%, 8.99%, 33.53%, 24.48%, 12.59% and 0.03% in a sequence.

Example 6: The mix ratios by weight of a modified dark pigment (the mass ratio of iron oxide black to an aniline black mixture is 1:1), ordinary Portland cement, silica fume, blast furnace slag powder, lightweight coarse aggregate, lightweight fine aggregate, water and polycarboxylate superplasticizer powder are 2.35%, 17.62%, 1.17%, 8.23%, 33.53%, 24.48%, 12.59% and 0.03% in a sequence.

Wherein the modified dark pigment is prepared by the following steps: mixing 196 transparent resin, 3% of a hardener and 1.5% of an accelerator, wherein the volume ratio of the pigment to the resin is 1:0.2, curing at a normal temperature for 4 h, curing at 60° C. for 4 h, breaking, and grinding with a vibration mill until the fineness is greater than 400 meshes.

Example 7: The mix ratios by weight of calcium carbonate powder, ordinary Portland cement, silica fume, blast furnace slag powder, lightweight coarse aggregate, lightweight fine aggregate, water and polycarboxylate superplasticizer powder are 0.87%, 17.62%, 1.36%, 9.52%, 33.53%, 24.48%, 12.59% and 0.03% in a sequence.

Example 8: The mix ratios by weight of calcium carbonate powder, ordinary Portland cement, silica fume, blast furnace slag powder, lightweight coarse aggregate, lightweight fine aggregate, water and polycarboxylate superplasticizer powder are 1.47%, 17.62%, 1.29%, 8.99%, 33.53%, 24.48%, 12.59% and 0.03% in a sequence.

Example 9: The mix ratios by weight of calcium carbonate powder, ordinary Portland cement, silica fume, blast furnace slag powder, lightweight coarse aggregate, lightweight fine aggregate, water and polycarboxylate superplasticizer powder are 2.35%, 17.62%, 1.17%, 8.23%, 33.53%, 24.48%, 12.59% and 0.03% in a sequence.

Example 10: The mix ratios by weight of a modified dark pigment (the mass ratio of iron oxide black to an aniline black mixture is 1:1), calcium carbonate powder, ordinary Portland cement, silica fume, blast furnace slag powder, lightweight coarse aggregate, lightweight fine aggregate, water and polycarboxylate superplasticizer powder are 1.47%, 0.87%, 17.62%, 1.18%, 8.23%, 33.53%, 24.48%, 12.59% and 0.03% in a sequence.

Example 11: The mix ratios by weight of a modified dark pigment (the mass ratio of iron oxide black to an aniline black mixture is 1:1), calcium carbonate powder, ordinary Portland cement, silica fume, blast furnace slag powder, lightweight coarse aggregate, lightweight fine aggregate, water and polycarboxylate superplasticizer powder are 1.47%, 1.47%, 17.62%, 1.10%, 7.71%, 33.53%, 24.48%, 12.59% and 0.03% in a sequence.

Example 12: The mix ratios by weight of a modified dark pigment (the mass ratio of iron oxide black to an aniline black mixture is 1:1), calcium carbonate powder, ordinary Portland cement, silica fume, blast furnace slag powder, lightweight coarse aggregate, lightweight fine aggregate, water and polycarboxylate superplasticizer powder are 1.47%, 2.35%, 17.62%, 0.99%, 6.94%, 33.53%, 24.48%, 12.59% and 0.03% in a sequence.

Example 13: The mix ratios by weight of unmodified bovine bone powder, ordinary Portland cement, silica fume, blast furnace slag powder, lightweight coarse aggregate, lightweight fine aggregate, water and polycarboxylate superplasticizer powder are 1.47%, 17.62%, 1.29%, 8.99%, 33.53%, 24.48%, 12.59% and 0.03% in a sequence.

Example 14: The mix ratios by weight of modified bovine bone powder, ordinary Portland cement, silica fume, blast furnace slag powder, lightweight coarse aggregate, lightweight fine aggregate, water and polycarboxylate superplasticizer powder are 0.87%, 17.62%, 1.36%, 9.52%, 33.53%, 24.48%, 12.59% and 0.03% in a sequence.

Example 15: The mix ratios by weight of modified bovine bone powder, ordinary Portland cement, silica fume, blast furnace slag powder, lightweight coarse aggregate, lightweight fine aggregate, water and polycarboxylate superplasticizer powder are 1.47%, 17.62%, 1.29%, 8.99%, 33.53%, 24.48%, 12.59% and 0.03% in a sequence.

Example 16: The mix ratios by weight of modified bovine bone powder, ordinary Portland cement, silica fume, blast furnace slag powder, lightweight coarse aggregate, lightweight fine aggregate, water and polycarboxylate superplasticizer powder are 2.35%, 17.62%, 1.17%, 8.23%, 33.53%, 24.48%, 12.59% and 0.03% in a sequence.

A bovine bone powder modification method comprises the following steps: adding 100-mesh bovine bone powder into a phosphoric acid solution with the concentration of 2%, wherein the weight ratio of the bovine bone powder to the phosphoric acid solution is 1:3, and the temperature is 20-30° C.; stirring in a stirrer at a rotating speed of 200-500 rpm for 30 min, centrifuging for 3 min by a centrifugal machine at a rotating speed of 3,000-5,000 rpm, pouring out the supernatant, and washing the centrifuged solid substance for 2-3 times by using water until washing water did not show acidity anymore; and performing vacuum drying on the centrifuged solid substance at the temperature of 40° C., grinding the dried bovine bone powder and slag powder in a mass (weight) ratio of 1:4 by using a vibration mill until the fineness is more than 200 meshes, and standing for later use.

Example 17: The mix ratios by weight of calcium carbonate powder, zinc sulfate, a modified dark pigment (the mass ratio of iron oxide black to an aniline black mixture is 1:1), ordinary Portland cement, blast furnace slag powder, silica fume, lightweight coarse aggregate, lightweight fine aggregate, water and polycarboxylate superplasticizer powder are 2.35%, 0.5%, 1.47%, 17.62%, 0.93%, 6.50%, 33.53%, 24.48%, 12.59% and 0.03% in a sequence.

Example 18: The mix ratios by weight of calcium carbonate powder, zinc sulfate, a modified dark pigment (the mass ratio of iron oxide black to an aniline black mixture is 1:1), ordinary Portland cement, blast furnace slag powder, silica fume, lightweight coarse aggregate, lightweight fine aggregate, water and polycarboxylate superplasticizer powder are 2.35%, 1.2%, 1.47%, 17.62%, 0.84%, 5.89%, 33.53%, 24.48%, 12.59% and 0.03% in a sequence.

Example 19: The mix ratios by weight of zinc sulfate, a modified dark pigment (the mass ratio of iron oxide black to an aniline black mixture is 1:1), modified biological calcium powder (the mass ratio of modified bovine bone powder to oyster shell powder is 2:1), calcium carbonate powder, ordinary Portland cement, silica fume, blast furnace slag powder, crushed stone, sand, water and polycarboxylate superplasticizer powder are 0.5%, 1.47%, 1.47%, 0.87%, 17.62%, 0.94%, 6.50%, 33.53%, 24.48%, 12.59% and 0.03% in a sequence.

Example 20: The mix ratios by weight of zinc sulfate, a modified dark pigment (the mass ratio of iron oxide black to an aniline black mixture is 1:1), modified biological calcium powder (the mass ratio of modified bovine bone powder to oyster shell powder is 2:1), calcium carbonate powder, ordinary Portland cement, silica fume, blast furnace slag powder, crushed stone, sand, water and polycarboxylate superplasticizer powder are 0.6%, 1.47%, 1.47%, 0.87%, 17.62%, 0.92%, 6.42%, 33.53%, 24.48%, 12.59% and 0.03% in a sequence.

A modification method of zinc sulfate comprises the following steps: selecting diatomite with $SiO_2$ content of more than 90% and fineness of 600 meshes, adding 150 g of water into a stirrer at 60° C., then adding 100 g of zinc sulfate, stirring until the zinc sulfate is completely dissolved, and standing for later use; and then heating 150 g of diatomite to 60° C., adding the diatomite into the solution, stirring for 10 min in a stirrer at a rotating speed of 200-500 rpm, and then drying in a drying oven with a temperature of 100° C., thus obtaining the modified zinc sulfate.

Example 21: The mix ratio by weight of zinc sulfate, a modified dark pigment (the mass ratio of iron oxide black to an aniline black mixture is 1:1), modified biological calcium powder (the mass ratio of modified bovine bone powder to oyster shell powder is 2:1), calcium carbonate powder, ordinary Portland cement, silica fume, blast furnace slag powder, crushed stone, sand, water, chopped fibers and polycarboxylate superplasticizer powder are 0.5%, 1.47%, 1.47%, 0.87%, 17.62%, 0.94%, 6.50%, 33.07%, 24.14%, 12.59%, 0.8% and 0.03% in a sequence.

The implementation method of the Examples 1-21 comprised the following specific operation steps:

Three disc samples with size of Φ100×50 mm and five plate samples with the diameter of 200×200×30 mm are prepared according to the above preparation method of the concrete settlement substrate with the rough surface for oyster, and are used for respectively testing the chloride ion penetration resistance of the concrete for 28 d and the settlement and metamorphosis conditions of oyster larvae in a laboratory after standard curing for 28 d. The specific operation steps are as follows:

(I) Molding of Samples

1, Ordinary Portland cement, lightweight coarse aggregate, lightweight fine aggregate, water, a dark pigment, biological calcium powder (ratio of modified bovine bone powder to oyster shell powder is 2:1), calcium carbonate powder, trace elements, chopped fibers and polycarboxylate superplasticizer powder are accurately weighed according to the above mass;

2, Abrasive paper with different surface roughness (including 20 meshes, 60 meshes and 200 meshes) are stuck in molds of the plate samples of concrete for later use;

3, The lightweight coarse aggregate and the lightweight fine aggregate are put into a concrete mixer for mixing for 0.5-1 min; then the ordinary Portland cement, the biological calcium powder (ratio of modified bovine bone powder to oyster shell powder is 2:1), the calcium carbonate powder, the trace elements and the dark pigment are added and continuously mixed for 0.5-1 min; the chopped fibers, the water and a superplasticizer are added and mixed for 2-6 min; after obtaining desired homogeneity mixing, casting, consolidating and demolding are performed to obtain three disc samples with the size of Φ100×50 mm and five plate samples with the size of 200×200×30 mm; and 4, The demolded concrete samples are immediately put into a CO2 curing chamber with 10 atmospheric pressures for curing for 2 h to reduce the alkalinity of the concrete samples, and standard curing is performed for 28 d; corresponding permeability evaluation is performed at each age, and oyster larva settlement and metamorphosis experiments are performed in a laboratory after 28 d.

(II) Specific Steps of a Rapid Chloride Ion Penetration Experiment:

According to "Standard Test for Electrical Indication of Concrete's Ability to Resist Chloride Ion Penetration" (ASTM1202-2017), when standard curing is carried out for 28 d, three disc samples with the diameter of Φ100×50 mm are taken out from a curing chamber respectively, water and impurities on the surfaces of the disc samples are cleaned, and after the surfaces of the disc samples are dried, and the side surfaces of the disc samples are coated with a thin layer of epoxy resin. Then the samples are put into a vacuum water saturation machine for 20-24 h. The samples are taken out, the surfaces of the samples are cleaned, and the samples are put into polymethyl methacrylate molds, and after the sealing property between the samples and the molds is detected, a sodium chloride solution (an electrode is connected with a negative electrode of a power supply) with the mass concentration of 3% and a sodium hydroxide solution (an electrode is connected with a positive electrode of the power supply) with the molar concentration of 0.3 mol/L are respectively placed into the molds on the two sides. An experimental instrument is started, experimental data are recorded after 6 h, and the operations are repeated on the two subsequent samples. Finally, electric flux calculation is carried out according to specifications.

(III) Specific Step of an Indoor Settlement and Metamorphosis Experiment of Oyster Larvae After standard curing is carried out for 28 d, plate samples with the sizes of 200×200×30 mm are taken out from the curing room respectively, and water and impurities on the surfaces of the samples are cleaned; then the samples are put into a test pool, and the test pool is prepared in a laboratory, wherein the abundance of the oyster larvae is 0.85 ind/ml3, seawater in the pool is sand-filtered Huang Hai seawater, and the salinity is about 32-34%; after the water level of the seawater is higher than that of the concrete samples, oxygen pipes are uniformly distributed into the test pool, and the oyster larvae are prepared to be put into the test pool. After the oyster larvae are slowly and uniformly mixed in a water bucket, the mass of the seawater containing the oyster larvae is accurately weighed by using a beaker, and then the seawater is uniformly distributed into the test pool.

After an oyster settlement induction test is started, seawater in the test pool is replaced every day, the water replacement amount is ⅓ of the total capacity of the test pool, a sieve (larger than or equal to 200 meshes) is used for blocking a water outlet, non-settled oyster larvae are prevented from being lost along with water, the larvae on the sieve are put into the test pool again, *chlorella* is fed regularly and quantitatively through a rubber head dropper at 9 a.m. and 7 p.m. every day, and the oyster settlement condition is observed.

After the test continued to the designated age, water in the test pool is drained, the samples are taken out, the number on the surfaces of the samples are counted, recorded and survival rate of the oysters on the surfaces of the samples are analyzed, and the smooth bottom face in concrete casting molding is taken during counting.

Compared with "A novel concrete artificial fish reef and a preparation method thereof" or CN104529286 A (hereafter, "comparison document 1"), the difference is that:

The objective of the present disclosure is different from that of the comparison document in that: Although oyster shell powder is added into the concrete in the comparison document 1, the objective of the comparison document 1 is to utilize wastes and repair and improve the artificial fish reef. The objective of the present disclosure is to induce the settlement of the oyster larvae.

Compared with "A bionic concrete artificial fish reef and a preparation method thereof" or 2015 CN104938384 A (hereafter, "comparison document 2), the difference is that:

(1) The objective of the present disclosure is different from that of the comparison document 2 in that: Although the oyster shells or oyster shell powder is added into the concrete in the comparison document 2, the objective of the comparison document 2 is mainly achieved through the surface bionic property, including fish, microorganisms and algae, the number of the microorganisms is increased, and thus the water environment is improved; and oysters are not mentioned. The objective of the present disclosure is to induce the settlement of the oyster larvae.

(2) The comparison document 2 indicated that the cement replaced by the biological calcium carbonate powder (150-200 meshes) below 10% had no obvious effect on settlement induction. However, the modified bovine bone powder and biological calcium carbonate powder (with the fineness being 100-1,000 meshes) are adopted in the research process of the present disclosure, and the optimal dosage of the bovine bone powder and the biological calcium carbonate powder accounted for less than 10% of the cementitious material.

(3) The bovine bone powder and the biological calcium carbonate powder are modified and are specifically modified by treating the 100-500-mesh egg shell powder, coral powder, oyster shell powder and fishbone powder with one or two of acetic acid, acetic acid aqueous solution, silicic acid and sulfurous acid, and treating the 100-500-mesh bovine bone powder with one or two of diluted phosphoric acid, sulfuric acid, hydrochloric acid and nitric acid.

(4) Comparison document had difficulty in inlaying oyster shells on the concrete surface, the method is not adopted on each engineering surface, and the feasibility is low. In the present disclosure, the shell powder is added into the concrete to induce the settlement of the sessile organisms, and the dosage of the shell powder accounted for less than 10% of the mass of the cementitious material, the construction is simple, and the settlement amount of the oyster could be greatly increased. And (5) The phenomenon of serious artificial fish reef corrosion occurred in the marine environment for many times in recent years, and serious corrosion is mainly caused by the combined action of biological sulfuric acid secreted by anaerobic microorganism *Thiobacillus* and acidic substances secreted by other bacteria. The acid corrosion resistance of calcium carbonate is very weak, so that serious acid corrosion could be caused by too high content of calcium carbonate with relatively high fineness.

Compared with a "Effect of the Substrate Types on Oyster Settlement, Growth, Population Establishment and Reef Development" by Fan Ruiling (hereafter, "comparison document 3), the difference is that:

(1) In the comparison document 3, 80-mesh bovine bone powder, calcium powder and gypsum powder are used and independently added into the concrete. The fineness of all calcium materials in the present disclosure is larger than 100 meshes and is larger than that of the materials in the comparison document 3. The bovine bone powder is also added and modified, and the concrete grain gradation and the induction capacity are considered.

Figure 1:
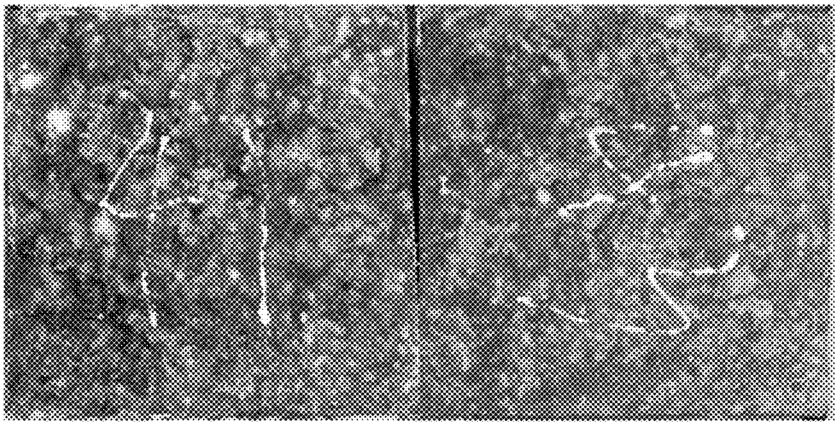
FIG. 1 shows mildewing condition on a surface of different concrete mix with 10% bovine bone powder (under standard curing)
Figure 2:
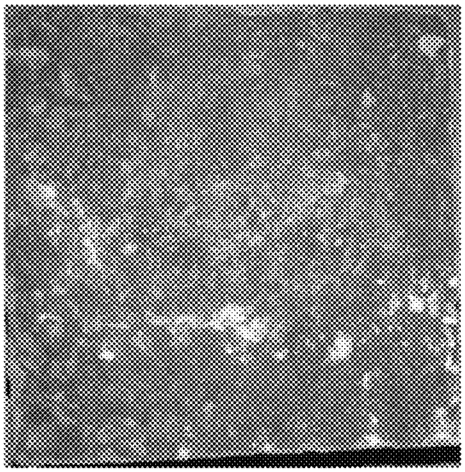
FIG. 2 shows different concrete mix adding 10% modified bovine bone powder with a fineness larger than 200 meshes.

(2) The bovine bone powder is ground by using a vibration mill under normal temperature conditions, when the fineness is greater than 80 meshes, the bovine bone powder contained lots of collagen and is severely agglomerated and could not be continuously ground. The diluted acid modification technology is adopted in the present disclosure, and the bovine bone powder is compounded with other substances and ground, so that the bovine bone powder with small particle size and modified biological calcium powder with the fineness of more than 200 meshes are obtained. The prepared biological calcium powder remained the original substances of biological calcium, greatly increased the release rate of the substances inducing oyster larvae to settle, reduced the dosage of the biological calcium powder, thereby reducing the effect on the cement concrete performance. And (3) Due to the fact that bovine bone powder contained rich organic substances such as collagen, the strength and the penetration resistance of concrete could be reduced when a large amount of the substances are added, especially after the dosage exceeded 5%, the strength of the concrete is rapidly reduced, the penetration resistance is remarkably reduced, and mildew could grow on the surface of the concrete under the standard curing condition. FIG. 1 showed the mildewing condition of the concrete samples. FIG. 2 showed the surface condition of the modified concrete.

As shown in FIG. 1, mildew on the surface of concrete is white flocculent and almost covered the whole surface of the concrete; under the same bovine bone powder dosage, age and curing conditions, the surface of the concrete in FIG. 2 is not mildewed.

In the present disclosure, a diluted acid modification technology and a composite grinding technology are adopted in a control way, the induction capability of the bovine bone powder is fully exerted, the dosage of the bovine bone powder is greatly reduced, and anti-corrosion treatment and modification are carried out, so that a composite inducer taking the bovine bone powder as a main component is realized, the dosage of the composite inducer is small, the strength and permeability of concrete are hardly influenced, meanwhile, the composite inducer has very strong oyster larva settlement capability, and the problem of mildewing of the concrete is solved. Compared with concrete without the inducer, the concrete with the inducer enables the number of settled oyster larvae to be obviously increased.

The comparison documents and consulted literature data showed that the calcium content is very important for the settlement of the oyster larvae, and some experimental results at present also proved that the settlement and the growth of the oyster larvae could be promoted by adding a proper dosage of calcium carbonate substances into a cement-based material. However, cement concrete contained a large number of calcium ions, the pH value in a pore solution is generally greater than 12.5, and the pH value of a saturated calcium hydroxide solution is about 12 at normal temperature, thus the concentration of the calcium ions in the pore solution of the concrete is about 5 mmol/L; and the solubility of calcium carbonate is very small and is only 9.5x10-5 mol/L (9.5x10-2 mmol/L) at 25° C. At present, the optimal range of the concentration of the calcium ions for inducing the settlement of the oysters is 10-25 mmol/L, and even if the oyster larvae are placed in the saturated calcium carbonate solution, the concentration of $Ca^{2+}$ is not enough to provide the appropriate ion concentration for the settlement of the oysters. Further, $Ca(OH)_2$ in the cement concrete could be released more quickly, and the dissolution of the calcium carbonate needed a longer time. Therefore, it could be understood or inferred that the calcium carbonate material added into the concrete could promote the settlement of the oyster larvae, and the $Ca^{2+}$ did not play a leading role. The early settlement and metamorphosis of the oysters are related to $HCO_3^-$, and the secondary shells of the calcium carbonate are generated by $HCO_3^-$ together with the $Ca^{2+}$ during metamorphosis. After the calcium carbonate is added, the calcium carbonate reacted with $CO_2$ and water to generate $Ca(HCO_3)_2$ to participate in the settlement, which is a fundamental mechanism for promoting the settlement of the oyster larvae.

There is an optimum dosage in the dosage of calcium carbonate in the cement-based material, which could be explained from the following three aspects:

1) For equivalent substituted cement, the alkali in the concrete is diluted along with the increase of the dosage of the calcium carbonate, and the total alkalinity is reduced; however, along with the increase of the dosage of the calcium carbonate, the dissolution probability of the calcium carbonate in the concrete is increased, and the content of $HCO_3^-$ in the solution is increased, thus the settlement and the metamorphosis of the oysters are promoted; however, when the dosage is too large, the permeability of the concrete is increased sharply, and the alkali and carbonate radicals in the concrete are quickly leached, so that the negative effect of the alkali is prominent, and the critical or negative effect of the carbonate radicals is initially prominent, thus the settlement amount is reduced;

2) For equivalent substituted aggregate, the permeability of the concrete is reduced along with the increase of the dosage, consequently, the leach of calcium ions and $OH^-$ is reduced, but the leach rate of carbonate ions is gradually increased first, and when the leach rate reached a certain value, oyster settlement reached a maximum value; and along with the continuous increase of the dosage, the reduction amplitude of the calcium ions is large, and the carbonate radicals are possibly reduced, thus the settlement of the oyster larvae is limited by the concentration of the calcium ions, and the settlement is reduced; and 3) For equivalent substituted mineral admixture, the permeability is increased along with the increase of the dosage, and the $HCO_3^-$ concentration reached a proper range for the oyster settlement due to the increase of calcium carbonate, which indicated the increase of the settled oyster larvae; and along with the continuous increase of the dosage of the mineral admixture, the dosage of the mineral admixture is reduced, so the amount of leaching alkali is increased, the carbonate radicals are increased, and the settlement of the oyster larvae is inhibited by excessive alkali and $HCO_3^-$ ions.

Compared with "Study on the Organisms Attachment of Artificial Reefs Constructed with Five Different Cements, by Li Zhenzhen, Gong Pihai, Guan Changtao, et al, Progress in Fishery Sciences, 2017, 38(5):57-63 (hereafter, "comparison document 4"), the difference is that:

In the comparison document 4, composite Portland cement, slag Portland cement, pozzolanic Portland cement, fly ash Portland cement and aluminate cement were used. In the present disclosure, low-alkalinity cement is achieved by ordinary Portland cement adding mineral admixtures; silica fume is one of the mineral admixtures and had high activity, and optimum dosage of silica fume could achieve obvious effect on increasing the durability of reinforced concrete in the marine environment. Low-alkalinity cement with the excellent strength and durability could be obtained through optimization design and experiments. Meanwhile, by means of the high penetration resistance characteristic of the silica fume concrete, even if the alkalinity in the concrete is high, a large number of oyster larvae still adhered to, metamorphosized and grew on the concrete surface. The low-alkalinity sulphoaluminate cement is compounded to regulate and control the alkalinity of the cement concrete, and thus an appropriate pH value is provided for oyster larva settlement. In addition, compared to marine plants, oysters, barnacles and other sessile organisms are different in alkali resistance, the environments needed in the settlement period and later period are different, for example, a large number of calcium ions are needed for settlement, metamorphosis and later-period growth of the barnacles and the oysters.

Figure 3:
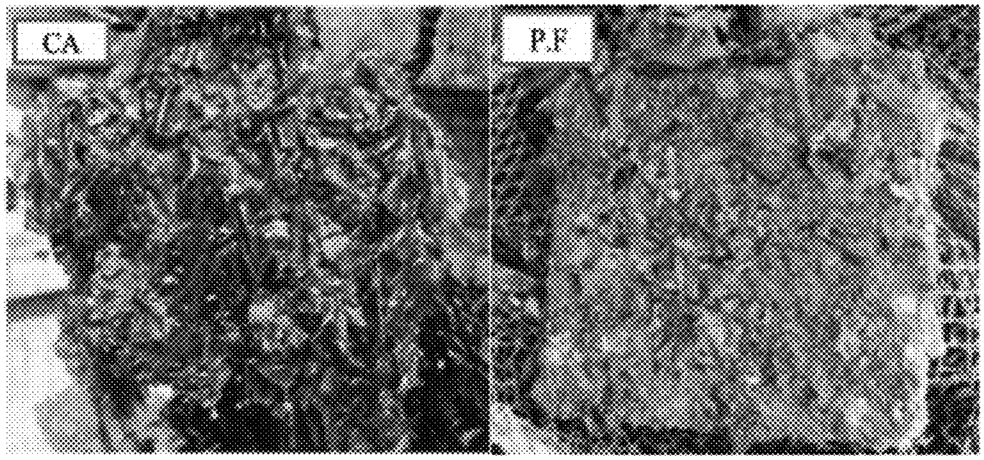
FIG. 3 is a picture of 210 d of a settlement experiment in sea.
Figure 4:
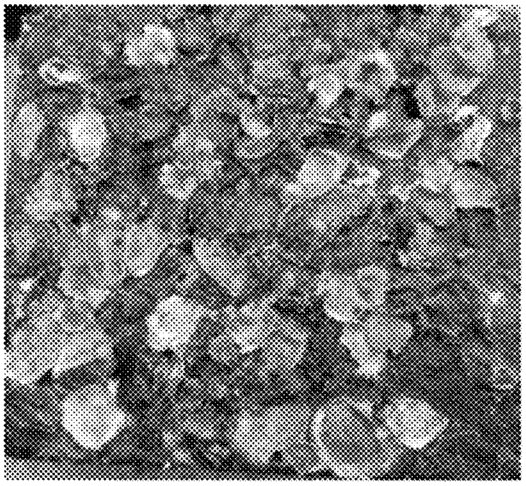
FIG. 4 is a picture of 300 d of a settlement experiment in sea.

In the comparison document 4, the concrete is used for enriching marine organisms, focusing on the amount and diversity of settled biomass, and the mainly settled organisms are various algae and the like. The research objective of the present disclosure is to induce the settlement of the oysters, but the alkalinity tolerance of oysters and barnacles is higher than that of algae, and a large amount of calcium ions are needed for settlement and metamorphosis of the oysters, so that the two kinds of concrete looked like the same, but in fact there is a big difference. FIG. 3 and FIG. 4 respectively showed the oyster settlement comparison conditions between the comparison document 4 after performing the real sea settlement experiment for about 210 d and the present disclosure after performing the real sea settlement experiment for 300 d.

In addition, the present disclosure has the unique characteristics and the following beneficial effects:

Dark Pigment

The light-shielding characteristic of oyster eyespot larvae is utilized, the dark pigment (one or two of iron oxide black, nigrosine, carbon black, antimony sulfide, iron oxide red and organic pigment red) are doped into the concrete, the color of the concrete is changed and darkened, the concrete is regarded as a dark environment by the oyster larvae, thus the oyster larvae are induced to reach the dark concrete surface, the contact probability of the larvae and the concrete surface are increased, and the induced settlement rate of the oyster larvae is increased. Specifically:

Marine organism researchers carried out the research on the settlement of marine sessile organisms by substrates with different colors in order to cultivation and propagation or eliminate unexpected populations, which belonged to the marine organism discipline. The marine organism discipline is quite different from the marine concrete engineering or concrete material discipline, they are completely two major disciplines. Through the crossing of the marine sessile organism discipline and the concrete discipline, the induced settlement of the oyster larvae by dark concrete is realized.

In the present disclosure, the dark pigment is added to deepen the surface color of concrete so as to promote the settlement of the oyster larvae. Other materials are added in the concrete, which could affect the properties of the concrete. In the present disclosure, in consideration of the concrete of different cements, there is a difference in surface color of the concrete. Therefore, the dosage of the dark substances could be determined according to the type and dosage of the cement. The dark pigment also affected the properties of the concrete. Most importantly, when the dark pigment is added, if the penetration rates of alkali, $Ca^{2+}$ and the like in the concrete are not controlled, the leached alkali could affect the settlement, metamorphosis and growth of the sessile organism larvae, and when the dosage is greater than a certain value, the settlement amount of the larvae is reduced. In the present disclosure, the penetration resistance of the concrete is designed and controlled, and the main measures are as follows: selection of the type of the dark pigment, control of the dosage and modification. With the increase of the dosage of the dark pigment, the settlement rate of the larvae is increased first, and when the dosage accounted of 0.5%-6% of the cementitious material, the settlement amount of the larvae is maximum, but is slightly increased or kept unchanged later.

Trace Elements

A large amount of zinc is enriched in the oyster body, and zinc concentration is far higher than that in the seawater in which the oyster lives, and meanwhile, the oyster body further contains more Fe, P and K elements. Meanwhile, proper concentration of $Zn^{+}$ and $K^{+}$ in the solution could promote early settlement and metamorphosis of the oyster larvae. Therefore, zinc sulfate, potassium sulfate, potassium nitrate, ferric sulfate, zinc phosphate, ammonium nitrate, potassium phosphate, ammonium phosphate, ferric phosphate and calcium phosphate are adopted as the trace elements to be doped into the concrete, and these substances are modified to enable the strength and the penetration resistance of the concrete to be basically kept unchanged, and thus the induced settlement rate of the oyster larvae is greatly increased. Specifically: Marine organism researchers carried out the research on the settlement and metamorphosis of different ions to marine sessile organisms in order to clarify oyster settlement mechanisms and cultivation propagation, which belonged to the marine organism discipline. The marine organism discipline is quite different from the marine concrete engineering or concrete material discipline, they are completely two major disciplines. Through the crossing of the marine sessile organism discipline and the concrete discipline, corresponding substances are added into the concrete to induce the oyster larvae to settle on the surface of the concrete. Soluble salts had great influence on the properties of the concrete, such as influence on early workability, setting time and later strength and penetration resistance. Diatomite is adopted as a carrier in the present disclosure, the inorganic salts are fixed in the diatomite, thus the influence of the soluble salts on the properties of the concrete is reduced. Meanwhile, the effect of improving the properties of the concrete by the diatomite is utilized to keep good mechanical property and penetration resistance of the concrete when these inducing substances are added. In addition, diatomite serving as the carrier had a slow release effect, thus soluble salt is released slowly, and particularly, the release is kept at a very low rate after the diatomite is soaked in seawater for a certain period of time. Therefore, the above knowledge related to crossing of the marine sessile organism discipline, chemistry and marine concrete engineering disciplines, and technicians in the fields of concrete and engineering or the field of marine organisms could not obtain the technical characteristics of close correlation between the technology of doping the trace elements into the concrete to change the ion content of the trace elements on the surface of the concrete and control the permeability of the concrete and the concrete with the capability of efficiently inducing the settlement of the oysters through the existing background.

Concrete Permeability

The strength and permeability of concrete are two main properties of the concrete. Different inducers added into reference concrete could influence the properties of the concrete. Therefore, when different substances are added to promote settlement, metamorphosis and later growth of the oyster larvae, it must be integrally controlled to make sure that the different substances did not have a big impact on the strength and permeability of the concrete, and then raw materials are selected according to the compatibility of various raw materials. If the properties of the raw materials could not meet the actual requirements, the raw materials are modified and then added so as to achieve the expected functions. In practice, although related research is performed by considering the influence of the dosage of calcium on oyster larva settlement, the properties of concrete, the water-cement ratio, the dosage of calcium, maintenance and the like are not considered, moreover, the leakage rate of alkali and ions in the concrete could be changed due to the change of the permeability of the concrete, the poorer the penetration resistance of the concrete was, the higher the leakage rate of the alkali and the ions in the concrete was, and the leakage rate might be exponentially increased. Therefore, the leached alkali and ions could greatly influence the larvae, a change from promoting settlement to inhibiting settlement might occur, and particularly when the content of cement is large, the situation is more serious. Therefore, when the inducer is added into the concrete, it must be guaranteed that the change of the penetration resistance of the concrete is within a controllable range, for example, the change could not exceed 10%. In this way, the induction effects could be compared, otherwise, the influence of single inducer addition or inducer composite addition on the induction effect of the oyster larvae could not be evaluated.

Only the optimum environment required by settlement, metamorphosis and later growth of marine sessile organisms is mastered, and concrete could be designed from the penetration resistance level of the concrete instead of only considering the dosage of various raw materials and ignoring the penetration resistance change of the concrete. Therefore, the above knowledge related to crossing of the marine sessile organism discipline, chemistry and marine concrete engineering disciplines, and technicians in the fields of concrete and engineering or the field of marine organisms could not obtain the technical characteristics of close correlation between the integral control technology of the penetration resistance of the concrete and the technology of promoting the capability of inducing the settlement of the oysters by the inducer through the existing background.

Roughness Gain

The rough surface provided better tactile stimulation and increased the settlement force for the oyster larvae to crawl and settle, and the retention time of the oyster larvae on the substrate is increased; meanwhile, existing cracks and pits could protect the larvae and reduce the invasion probability of preys; compared with a smooth settlement substrate, this settlement substrate had a larger attachable area, so that the increase of the settlement rate of the oyster larvae on the settlement substrate with the rough surface is promoted.

In addition, fibers could reinforce the strength, especially the tensile strength, of the concrete. In the present disclosure, alkali-resistant fibers are combined with the concrete with ecological properties, so that the crack resistance, bending resistance and fatigue resistance of the concrete are enhanced. The early cracking of the concrete applied to breakwater members could be reduced, the damage ratio of the members in the processes of transportation and seaside fixing could be reduced, and especially the capacity of resisting extreme loads such as typhoon could be improved. Meanwhile, the weight of the concrete settlement substrate could be reduced by light weight aggregate concrete in the present disclosure, and the costs of transportation, labor and the like could be reduced in the processes of preparation, transportation and maintenance of samples. The labor cost of fishermen moving the settlement substrate and harvesting the oysters could be reduced or the costs of transportation, fixing and the like could be reduced during sea farming. The risk of breaking due to careless falling onto the ground during use could be reduced.

Therefore, the above knowledge related to crossing of the marine sessile organism discipline, marine plants and marine concrete engineering disciplines, and technicians in the fields of concrete and engineering or the field of marine organisms could not obtain the technical characteristics of close correlation between the technology of mixing the dark pigment into the concrete to change the color, the technology of modifying the bovine bone powder, the technology of grinding and the technology of controlling the permeability of the concrete and the concrete with the capability of efficiently inducing the settlement of the oysters and high durability concrete from the comparison documents 1-3. The technicians also cloud not obtain the technical characteristics of close correlation between the balance between the reduction of the alkalinity of the concrete and the concentration of calcium ions and the settlement of the marine sessile organisms from the comparison document 4.

The present disclosure would be described in detail below by means of Examples A, which are only used to illustrate the present disclosure and did not limit the scope of the present disclosure. The specific technical solution steps of the project plan are as follows:

Example A1

(1) Surveying of a sea area of an ecological engineering construction position: The dominant species of oysters in the sea area and whether the oysters are settled are surveyed; the test is performed 10 times in each season, and the air temperature, seawater temperature, dissolved oxygen, plankton, total dissolved inorganic nitrogen, active phosphate, active silicate, Ca2+, Zn2+, K+ and the like in the sea area are recorded; the typhoon times, strength and the like over the years are surveyed; the meteorological and hydrological data of the sea area for many years are looked up; and a feasible method and a solution for constructing an ecological riprap breakwater are analyzed.

(2) Manufacturing of a concrete settlement substrate: A lightweight concrete settlement substrate with a rough surface for oyster is manufactured using ecological concrete, the size of the settlement substrate is 10 cm×10 cm×2 cm, after demolding, curing with CO2 is carried out under 10 atmospheric pressures for 1 h, and then standard curing is carried out for 28 d.

(3) Regularly and quantitatively collecting and cultivating of oyster larvae: The settlement substrate with the rough surface is placed in a larva collection area of a nearby sea area in July, the collection of the larvae is stopped when the amount of settled oyster larvae is 20 larvae/100 cm2, and then the settlement substrate is moved to a sea area with rich baits for floating cultivation.

(4) Designing of a concrete member: Ecological engineering concrete member configuration design is performed by considering the influence of oyster settlement on the environment and wave absorption; in order to increase the settlement quantity of oysters as much as possible and provide space for other organisms, a thin-wall and multi-opening semi-spherical member is adopted, the internal voidage is more than 40%, six inclined columns are arranged on the surface of the semi-spherical member, and the overall volume of the member is 10 m3.

(5) Manufacturing of the concrete member: The semi-spherical member is manufactured, in particular a groove structure with a large inside and a small outside, by fiber-reinforced ecological concrete with significant inductive effect for marine sessile organism and through an elastic mold; and the concrete member is subjected to $CO_2$ curing for 2 h, and then subjected to standard curing for 28 d.

(6) Placing of concrete samples: In the concentration period of settlement and metamorphosis of oyster planktonic larvae in the local sea area of the next year, a dispersed placement method is adopted, the interaction of a plurality of members is considered, and the concrete members are connected by ropes;

(7) Placing of the oyster settlement substrate in site: The oyster settlement substrate with oysters (the gonad of oysters larvae develops into mature stage) greatly settled on the concrete surface is conveyed to the sea area for constructing the breakwater, one lightweight concrete settlement substrate with the rough surface for oyster is placed on each semi-spherical member and fixed on the semi-spherical member through a rope; in addition, *chlorella* concentrated bait is put in according to the planktonic condition of the local sea area. Meanwhile, the feeding amount is increased from 25,000 cells/mL, 40,000 cells/mL and 60,000 cells/mL to 80,000 cells/mL according to the development condition of the oyster larvae. And (8) Monitoring and managing the state of the larva settlement: When the settlement density of the oyster larvae on the concrete surface is 35 larvae/100 cm2 by monitoring, the oyster settlement substrate is moved away, and meanwhile, the type and quantity of plankton in the sea area are monitored to decide whether to continue to put in bait.

Example A2

(1) Surveying of a sea area of an ecological engineering construction position: The dominant species of oysters in the sea area and whether the oysters are settled are surveyed; the test is performed 15 times in each season, and the air temperature, seawater temperature, dissolved oxygen, plankton, total dissolved inorganic nitrogen, active phosphate, active silicate, Ca2+, Zn2+, K+ and the like in the sea area are recorded; the typhoon times, strength and the like over the years are surveyed; the meteorological and hydrological data of the sea area for many years are looked up; and a feasible method and a solution for constructing an ecological riprap breakwater are analyzed.

(2) Manufacturing of a concrete settlement substrate: A lightweight concrete settlement substrate with a rough surface for oyster is manufactured using ecological concrete, the size of the settlement substrate is 10 cm×10 cm×3 cm, after demoulding, curing with CO2 is carried out under 10 atmospheric pressures for 1.5 h, and then standard curing is carried out for 28 d.

(3) Regularly and quantitatively collecting and cultivating of oyster larvae: The lightweight and rough settlement substrate is placed in a larva collection area of a nearby sea area in August, the collection of the larvae is stopped when the settlement amount of the oyster larvae is 20 larvae/100 cm2, and then the settlement substrate is moved to a sea area with rich baits for floating cultivation.

(4) Designing of a concrete member: Ecological engineering concrete member configuration design is performed by considering the influence of oyster settlement on the environment and wave absorption; in order to increase the settlement quantity of the oysters as much as possible and provide space for other organisms, a thin-wall and multi-opening semi-spherical member is adopted, the internal voidage is more than 50%, six inclined columns are arranged on the semi-spherical member, and the overall volume of the member is 15 m3.

(5) Manufacturing of the concrete member: The semi-spherical member is manufactured, in particular a groove structure with a large inside and a small outside, by fiber-reinforced ecological concrete with significant inductive effect for marine sessile organism and through an elastic mold; and the concrete member is subjected to CO2 curing for 2 h, and then subjected to standard curing for 28 d.

(6) Placing of concrete samples: In July of the next year, a dispersed placement method is adopted, the interaction of a plurality of semi-spherical members is considered, and the members are connected by ropes;

(7) Placing of the oyster settlement substrate in site: The oyster settlement substrate with the oysters (the gonad of oysters larvae develops into mature stage) greatly settled on the concrete surface is conveyed to the sea area for constructing the breakwater, one lightweight concrete settlement substrate with the rough surface for oyster is placed on each semi-spherical member and fixed on the semi-spherical member through a rope; in addition, concreted *chlorella* is fed according to the planktonic condition of the local sea area. Meanwhile, the feeding amount is increased from 30,000 cells/mL, 50,000 cells/mL and 70,000 cells/mL to 90,000 cells/mL according to the development condition of the oyster larvae.

(8) Monitoring and managing of the state of the larva settlement: When the settlement density of the oyster larvae on the concrete surface is 40 larvae/100 cm2 by monitoring, the oyster settlement substrate is moved away, and meanwhile, the type and quantity of plankton in the sea area are monitored to decide whether to continue to put in bait.

The oyster settlement substrate in the Examples A1 and A2 and concrete mix for casting is as follows:

The concrete mix of fiber-reinforced ecological concrete (1-22) with significant inductive effect for marine sessile organism, the type of the bionic concrete member (23), the concrete mix of the lightweight concrete settlement substrate with the rough surface for oyster are the same as those in the previous Examples 1-21, and the shape design of the concrete settlement substrate for oyster is specifically shown in FIGS. 5-7.

The elastic mold is adopted to prepare the member with a special shape, especially the groove structure with a large inside and a small outside; and the curing mode is determined according to the mix of the concrete, the alkalinity and the penetration resistance of the concrete.

1: According to the concrete mix of ordinary Portland cement, the mix ratios by weight of the ordinary Portland cement, the crushed stone, the sand, the water and the polycarboxylate superplasticizer powder are 17.1%, 46.67%, 29.0%, 7.2% and 0.03% in a sequence.

Wherein the parent rock of the crushed stone is one of basalt and diabase, the maximum particle size of the crushed stone is not more than 50 mm, and the crushed stone is well graded; the sand is one or more of river sand, machine-made sand (the parent rock is one of granite and basalt) or desalinated sea sand, and is well graded. The water should meet the concrete water standard (JGJ63-2006), the Cl− content is less than 1,000 mg/L, the pH value is more than 4.5, and the influence on the initial setting time, final setting time, strength and permeability of cement is small. In the Examples A1 to 22, the above materials are the same.

2: According to the mixing ratio of reference concrete, the mix ratios by weight of the ordinary Portland cement, the silica fume, the blast furnace slag powder, the crushed stone, the sand, the water and the polycarboxylate superplasticizer powder are 10.26%, 0.86%, 5.98%, 46.67%, 29.0%, 7.2% and 0.03% in a sequence.

| Group | Dosage in concrete mass | | | Rate of change relative to reference group | |
|---|---|---|---|---|---|
| | Portland cement | slag powder | Silica fume | Electric flux | Oyster larva settlement rate |
| Example A1 | 17.1% | 0% | 0% | 40% | −31% |
| Example A2 | 10.26% | 5.98% | 0.86% | 0% | 0% |

The above examples showed that the blast furnace slag powder and the silica fume are doped into concrete, voids among particles such as cement could be filled, a pozzolanic reaction could be generated, micro-structure of an interface transition zone is improved, therefore, the basic strength of the concrete is guaranteed, and the alkalinity and permeability of the concrete are reduced. The alkalinity difference between the concrete and seawater in contact with the concrete is reduced, the alkali release rate could be controlled through the low permeability, and finally oyster larvae could be settled to the surface of the concrete more easily.

3: The mix ratios by weight of the unmodified dark pigment, the ordinary Portland cement, the silica fume, the blast furnace slag powder, the crushed stone, the sand, the water and the polycarboxylate superplasticizer powder are 0.51%, 10.26%, 0.79%, 5.54%, 46.67%, 29.0%, 7.2% and 0.03% in sequence.

4: The mix ratios by weight of the unmodified dark pigment, the ordinary Portland cement, the silica fume, the blast furnace slag powder, the crushed stone, the sand, the water and the polycarboxylate superplasticizer powder are 0.86%, 10.26%, 0.75%, 5.23%, 46.67%, 29.0%, 7.2% and 0.03% in sequence.

5: The mix ratios by weight of the unmodified dark pigment, the ordinary Portland cement, the silica fume, the blast furnace slag powder, the crushed stone, the sand, the water and the polycarboxylate superplasticizer powder are 1.37%, 10.26%, 0.68%, 4.79%, 46.67%, 29.0%, 7.2% and 0.03% in sequence.

6: The mix ratios by weight of the modified dark pigment (the mass ratio of iron oxide black to the aniline black mixture is 1:1), the ordinary Portland cement, the silica fume, the blast furnace slag powder, the crushed stone, the sand, the water and the polycarboxylate superplasticizer powder are 0.51%, 10.26%, 0.79%, 5.54%, 46.67%, 29.0%, 7.2% and 0.03% in a sequence.

7: The mix ratios by weight of the modified dark pigment (the mass ratio of iron oxide black to the aniline black mixture is 1:1), the ordinary Portland cement, the silica fume, the blast furnace slag powder, the crushed stone, the sand, the water and the polycarboxylate superplasticizer powder are 0.86%, 10.26%, 0.75%, 5.23%, 46.67%, 29.0%, 7.2% and 0.03% in a sequence.

8: The mix ratios by weight of the modified dark pigment (the mass ratio of iron oxide black to the aniline black mixture is 1:1), the ordinary Portland cement, the silica fume, the blast furnace slag powder, the crushed stone, the sand, the water and the polycarboxylate superplasticizer powder are 1.37%, 10.26%, 0.68%, 4.79%, 46.67%, 29.0%, 7.2% and 0.03% in a sequence.

Wherein the modified dark pigment is prepared by the following steps: mixing 196 transparent resin, 3% of a hardener and 1.5% of an accelerator, wherein the volume ratio of the pigment to the resin is 1:0.2, curing at a normal temperature for 4 h, curing at 60° C. for 4 h, breaking, and grinding with a vibration mill until the fineness is greater than 400 meshes.

| Group | Dosage in concrete mass | | | | Rate of change relative to reference group | |
|---|---|---|---|---|---|---|
| | Unmodified dark pigment | Modified dark pigments | slag powder | Silica fume | Electric flux | Oyster larva settlement rate |
| Example A3 | 0.51% | | 5.98% | 0.86% | 0.4% | 21% |
| Example A4 | 0.86% | | 5.23% | 0.75% | 21% | 38% |
| Example A5 | 1.37% | | 4.79% | 0.68% | 34% | 32% |
| Example A6 | | 0.51% | 5.98% | 0.86% | −1.6% | 27% |

-continued

| | Dosage in concrete mass | | | | Rate of change relative to reference group | |
|---|---|---|---|---|---|---|
| Group | Unmodified dark pigment | Modified dark pigments | slag powder | Silica fume | Electric flux | Oyster larva settlement rate |
| Example A7 | | 0.86% | 5.23% | 0.75% | 0.5% | 47% |
| Example A8 | | 1.37% | 4.79% | 0.68% | 3.2% | 53% |

The dark pigment had great influence on permeability of concrete, and the settlement amount of the oyster larvae is reduced along with increase of the dosage. On one hand, due to the fact that the permeability of the concrete is increased, leach of alkali of the concrete is increased; on the other hand, iron oxide in the concrete is possibly converted into iron ions, so that the concentration of the iron ions is increased, and settlement of the oyster larvae is inhibited. In order to solve the problems, after the pigment is coated with resin, the pigment is ground into powder, thus the permeability resistance of the concrete could be greatly improved, and particularly when the dosage is 1.37%, the electric flux of the concrete is only increased by 3.2%. Meanwhile, along with increase of the dark pigment, the settlement of the oysters is continuously increased, it is different from the situation that the dosage is 1.37% before modification, the settlement ratio of the oyster larvae is reduced.

9: The mix ratios by weight of the unmodified bovine bone powder, the ordinary Portland cement, the silica fume, the blast furnace slag powder, the crushed stone, the sand, the water and the polycarboxylate superplasticizer powder are 0.51%, 10.26%, 0.79%, 5.54%, 46.67%, 29.0%, 7.2% and 0.03% in a sequence.

10: The mix ratios by weight of the unmodified bovine bone powder, the ordinary Portland cement, the silica fume, the blast furnace slag powder, the crushed stone, the sand, the water and the polycarboxylate superplasticizer powder are 0.86%, 10.26%, 0.75%, 5.23%, 46.67%, 29.0%, 7.2% and 0.03% in a sequence.

11: The mix ratios by weight of the unmodified bovine bone powder, the ordinary Portland cement, the silica fume, the blast furnace slag powder, the crushed stone, the sand, the water and the polycarboxylate superplasticizer powder are 1.37%, 10.26%, 0.68%, 4.79%, 46.67%, 29.0%, 7.2% and 0.03% in a sequence.

12: The mix ratios by weight of the modified bovine bone powder, the ordinary Portland cement, the silica fume, the blast furnace slag powder, the crushed stone, the sand, the water and the polycarboxylate superplasticizer powder are 0.51%, 10.26%, 0.79%, 5.54%, 46.67%, 29.0%, 7.2% and 0.03% in a sequence.

13: The mix ratios by weight of the modified bovine bone powder, the ordinary Portland cement, the silica fume, the blast furnace slag powder, the crushed stone, the sand, the water and the polycarboxylate superplasticizer powder are 0.86%, 10.26%, 0.75%, 5.23%, 46.67%, 29.0%, 7.2% and 0.03% in a sequence.

14: The mix ratios by weight of the modified bovine bone powder, the ordinary Portland cement, the silica fume, the blast furnace slag powder, the crushed stone, the sand, the water and the polycarboxylate superplasticizer powder are 1.37%, 10.26%, 0.68%, 4.79%, 46.67%, 29.0%, 7.2% and 0.03% in a sequence.

100-mesh bovine bone powder is added into a phosphoric acid solution with a concentration of 2%, and the weight ratio of the bovine bone powder to the phosphoric acid solution is 1:3. The bovine bone powder and the phosphoric acid solution are mixed in a stirrer at a rotating speed of 200-500 rpm for 30 min under temperature of 20-30° C., and then are centrifuged for 3 min by a centrifugal machine at a rotating speed of 3,000-5,000 rpm. The supernatant is poured, and the centrifuged solid substance is washed for 2-3 times by using water until washing water did not show acidity anymore; and vacuum drying is performed on the centrifuged solid substance at the temperature of 40° C., the dried bovine bone powder and slag powder in a ratio of 1:4 are ground by using a vibration mill until the fineness is more than 200 meshes for later use.

| | Dosage in concrete mass | | | | Rate of change relative to reference group | |
|---|---|---|---|---|---|---|
| Group | Unmodified bovine bone powder | Modified bovine bone powder | slag powder | Silica fume | Electric flux | Oyster larva settlement rate |
| Example A9 | 0.51% | | 5.98% | 0.86% | 20% | 90% |
| Example A10 | 0.86% | | 5.23% | 0.75% | 42% | 145% |
| Example A11 | 1.37% | | 4.79% | 0.68% | 57% | 205% |
| Example A12 | | 0.51% | 5.98% | 0.86% | −0.5% | 117% |
| Example A13 | | 0.86% | 5.23% | 0.75% | 2.1% | 233% |
| Example A14 | | 1.37% | 4.79% | 0.68% | 4.2% | 400% |

Note:
The modified bovine bone powder is ground until the fineness is 200 meshes to 300 meshes.

Because the grinding difficulty of bovine bone powder is high, and the bovine bone powder is difficultly continuously ground when the granularity is about 100 meshes, the bovine bone powder of 100 meshes is chemically modified by diluted phosphoric acid with a concentration of 2%, and then the dried bovine bone powder and slag powder in a ratio of 1:4 are ground by using the vibration mill until the fineness is more than 200 meshes. Therefore, the contact of the modified bovine bone powder and alkaline substances in the concrete is increased, and meanwhile, the micro-structure in the concrete is more compact, and the previous mildew phenomenon is avoided. After modification, the penetration resistance of the concrete is improved under the condition of low dosage. Even if the dosage reached 1.37%, the electric flux is increased by only 4.2%, and the settlement change rate of oyster larvae is increased from 205% to 400%.

15: The mix ratios by weight of the modified bovine bone powder, the modified dark pigment, the oyster shell powder, the ordinary Portland cement, the silica fume, the blast furnace slag powder, the crushed stone, the sand, the water and the polycarboxylate superplasticizer powder are 0.51%, 0.86%, 0.51%, 10.26%, 0.62%, 4.34%, 46.67%, 29.0%, 7.2% and 0.03% in a sequence.

16: The mix ratios by weight of the modified bovine bone powder, the modified dark pigment, the oyster shell powder, the ordinary Portland cement, the silica fume, the blast furnace slag powder, the crushed stone, the sand, the water and the polycarboxylate superplasticizer powder are 0.86%, 0.51%, 0.86%, 10.26%, 0.58%, 4.03%, 46.67%, 29.0%, 7.2% and 0.03% in a sequence.

| | Dosage in concrete mass | | | | | Rate of change relative to reference group | |
|---|---|---|---|---|---|---|---|
| Group | Modified bovine bone powder | Oyster shell powder | Modified dark pigments | slag powder | Silica fume | Electric flux | Oyster larva settlement rate |
| Example A15 | 0.51% | 0.51% | 0.86% | 4.34% | 0.62% | 3.2% | 317% |
| Example A16 | 0.86% | 0.51% | 0.86% | 4.03% | 0.58% | 6.8% | 517% |

In the example, on the basis of reference concrete, the dark pigment, the oyster shell powder and the bovine bone powder are added, necessary $Ca^{2+}$ is provided for settlement and metamorphosis of the oysters through the reference concrete, and the alkalinity is relatively low. Meanwhile, the color of the concrete is darkened by the dark pigment, almost all visible light is absorbed, the surface of the concrete became black, and thus a dark environment is provided. $HCO_3$–, $PO_4^{3-}$ and various trace elements necessary for settlement of the oysters are provided by adding the shell powder and the bovine bone powder. Therefore, the settlement of the oysters is promoted by the above measures together, the settlement change rate of oyster larvae could reach 317% when the dark pigment accounted for 0.86%, the oyster shell powder accounted for 0.51% and the bovine bone powder accounted for 0.51%, and the settlement change rate is increased by 517% when the dark pigment accounted for 0.86%, the oyster shell powder accounted for 0.51% and the bovine bone powder accounted for 0.86%.

17: The mix ratios by weight of the calcium carbonate powder, the ordinary Portland cement, the silica fume, the blast furnace slag powder, the crushed stone, the sand, the water and the polycarboxylate superplasticizer powder are 0.51%, 10.26%, 0.79%, 5.54%, 46.67%, 29.0%, 7.2% and 0.03% in a sequence.

18: The mix ratios by weight of the calcium carbonate powder, the ordinary Portland cement, the silica fume, the blast furnace slag powder, the crushed stone, the sand, the water and the polycarboxylate superplasticizer powder are 0.86%, 10.26%, 0.75%, 5.23%, 46.67%, 29.0%, 7.2% and 0.03% in a sequence.

19: The mix ratios by weight of the calcium carbonate powder, the ordinary Portland cement, the silica fume, the blast furnace slag powder, the crushed stone, the sand, the water and the polycarboxylate superplasticizer powder are 1.37%, 10.26%, 0.68%, 4.79%, 46.67%, 29.0%, 7.2% and 0.03% in a sequence.

| | Dosage in concrete mass | | | Rate of change relative to reference group | |
|---|---|---|---|---|---|
| Group | Calcium carbonate powder | slag powder | Silica fume | Electric flux | Oyster larva settlement rate |
| Example A17 | 0.51% | 5.54% | 0.79% | −2.8% | 20% |
| Example A18 | 0.86% | 5.23% | 0.75% | −2.1% | 40% |
| Example A19 | 1.37% | 4.79% | 0.68% | −0.5% | 50% |

In the Example A, 600-mesh calcium carbonate powder with different dosages is used for equivalently replacing the mineral admixture. Along with the increase of the content of the calcium carbonate powder, the penetration resistance of the concrete is weakened, but the electric flux of the concrete is lower than a reference value, and even if the dosage is 1.37%, the penetration resistance of the concrete is still better than that of the reference group. Along with the increase of the dosage of the calcium carbonate powder, the dissolution probability of calcium carbonate in the concrete is increased, so that the settlement change rate is increased, specifically, the dosages are 0.51%, 0.86% and 1.37% respectively, and the settlement change rates of the oyster larvae are increased by 20%, 40% and 50% respectively.

20: The mix ratios by weight of the zinc sulfate, the modified dark pigment, the modified bovine bone powder, the calcium carbonate powder, the ordinary Portland cement, the silica fume, the blast furnace slag powder, the crushed stone, the sand, the water and the polycarboxylate superplasticizer powder are 0.3%, 0.86%, 0.86%, 0.51%, 10.26%, 0.54%, 3.77%, 46.67%, 29.0%, 7.2% and 0.03% in a sequence.

21: The mix ratios by weight of the zinc sulfate, the modified dark pigment, the modified bovine bone powder, the calcium carbonate powder, the ordinary Portland cement, the silica fume, the blast furnace slag powder, the crushed stone, the sand, the water and the polycarboxylate superplasticizer powder are 0.6%, 0.86%, 0.86%, 0.51%, 10.26%, 0.50%, 3.51%, 46.67%, 29.0%, 7.2% and 0.03% in a sequence.

A modification method of zinc sulfate comprises the following steps of: selecting diatomite with $SiO_2$ content of more than 90% and fineness of 600 meshes, adding 150 g of water into a stirrer at 60° C., then adding 100 g of zinc sulfate, and mixing until the zinc sulfate is completely dissolved for later use; and then heating 150 g of diatomite to 60° C., adding the diatomite into the solution, mixing for 10 min in the stirrer at a rotating speed of 200-500 rpm, and then drying in a drying oven with a temperature of 100° C., thus obtaining the modified zinc sulfate.

In addition, the specific operation steps of the implementation method of the above examples are the same as those of the previous Examples 1-21; and the comparison documents 2-4 which are the same as the previous examples are deleted.

Compared with "Vital breakwater—Coastal Green Infrastructure of New York" by Sun Yihe (hereafter, "comparison document 5"), the objective of the present disclosure is different from the comparison document in that: a "vital" breakwater is constructed in the comparison document 5, the concrete member is manufactured through low-alkali cement based on macroscopic design and surface texture, the marine biomass is increased, including marine plants and marine sessile organisms, and mainly including marine plants. In the present disclosure, besides low alkalization of

| | Dosage in concrete mass | | | | | | Rate of change relative to reference group | |
|---|---|---|---|---|---|---|---|---|
| Group | Zinc sulfate | Bovine bone powder | Calcium carbonate powder | Modified dark pigments | Silica fume | slag powder | Electric flux | Oyster larva settlement rate |
| Example A20 | 0.3% | 0.86% | 0.51% | 0.86% | 0.54% | 3.77% | 3.6% | 580% |
| Example A21 | 0.6% | 0.86% | 0.51% | 0.86% | 0.50% | 3.51% | 7.8% | 652% |

Note:
The dark pigment is modified iron oxide black and aniline black, and the mass ratio is 2:1.

In the example, the zinc sulfate, the bovine bone powder, the calcium carbonate powder and the dark pigment are added on the basis of reference concrete, necessary $Ca^{2+}$ is provided for settlement and metamorphosis of the oysters through the reference concrete, and the alkalinity is low. Meanwhile, the color of the concrete is darkened through the dark pigment, almost all visible light is absorbed, the surface of the concrete became black, and thus a dark environment is provided; $HCO_3-$ and $PO_4^{3-}$ are provided necessary ions for oyster settlement through adding of the bovine bone powder; and the calcium carbonate powder and various trace elements in the bovine bone powder and $Zn^+$ provided by the zinc sulfate are provided to promote the settlement of oyster larvae; all-around requirements are met in the aspects of ions and dark colors needed by early induced settlement and metamorphosis of the oyster larvae, and a good effect is achieved. The settlement change rate could reach 580% when the dark pigment accounted for 0.86%, the bovine bone powder accounted for 0.51%, the calcium carbonate powder accounted for 0.51% and the zinc sulfate accounted for 0.2%, and the settlement change rate is 652% when the dark pigment accounted for 0.86%, the bovine bone powder accounted for 0.51%, the calcium carbonate powder accounted for 0.51% and the zinc sulfate accounted for 0.6%.

22: The mix ratios by weight of zinc sulfate, modified dark pigment, modified bovine bone powder, calcium carbonate powder, ordinary Portland cement, the silica fume, blast furnace slag powder, crushed stone, sand, water, chopped fibers and polycarboxylate superplasticizer powder are 0.6%, 0.86%, 0.86%, 0.51%, 10.26%, 0.50%, 3.51%, 46.42%, 28.85%, 7.2%, 0.4% and 0.03% in a sequence.

23: The present disclosure used the above concrete to perform bionic configuration design on the concrete member, specifically shown in FIG. 8.

the cement, the dark pigment, the biological calcium powder, the calcium carbonate powder and the trace elements are added into concrete to induce the oyster larvae, the induction had the characteristics of being rapid and compact, the effect is good, and the ecological environment of the sea area could be improved to a great extent.

Because the knowledge related to crossing of marine sessile organism discipline, marine plants and marine concrete engineering disciplines, technicians in the fields of concrete and engineering or the field of marine organisms could not obtain the technical characteristic of close correlation between the balance between the concrete alkalinity reduction and the calcium ion concentration and the settlement of the marine sessile organisms from comparison documents 2-3.

In addition, the unique characteristics and the beneficial effects of the present disclosure are that: the contents of the dark pigments, the trace elements and the concrete permeability are the same as the above-mentioned unique characteristics and the beneficial effects.

Only the optimum environment required by settlement, metamorphosis and later growth of marine sessile organisms is mastered, and concrete could be designed from the penetration resistance level of the concrete instead of only considering the dosage of various raw materials and ignoring the penetration resistance change of the concrete. Therefore, the above knowledge related to crossing of the marine sessile organism discipline, chemistry and marine concrete engineering disciplines, and technicians in the fields of concrete and engineering or the field of marine organisms could not obtain the technical characteristics of close correlation between the integral control technology of the penetration resistance of the concrete and the technology of promoting the capability of inducing the settlement of the oysters by the inducer through the existing background.

Additionally or Alternatively, the dark pigment is one or two of iron oxide black, nigrosine, carbon black, antimony sulfide, iron oxide red and organic pigment red.

Additionally or Alternatively, the above dark pigments are modified according to the influence degree on the concrete properties; and one of transparent resin, organosilicon, dimethylsiloxane and a superhydrophobic material is used for modification treatment.

Additionally or Alternatively, the biological calcium powder is bovine bone powder, and the biological calcium carbonate powder comprises one or more of oyster shell powder, fishbone powder, egg shell powder and coral powder, with fineness of 100-1,000 meshes.

Additionally or Alternatively, the biological calcium powder is obtained by treating the 100-500-mesh egg shell powder, coral powder, oyster shell powder and fishbone powder with one or two of acetic acid, silicic acid and sulfurous acid, and by treating the 100-500-mesh bovine bone powder with one or two of diluted phosphoric acid, sulfuric acid, hydrochloric acid and nitric acid.

Additionally or Alternatively, the calcium carbonate powder is calcite powder, chalk powder, limestone powder, marble powder, aragonite powder, travertine powder, and one or more of processed lightweight calcium carbonate, active calcium carbonate, calcium carbonate whiskers and ultrafine lightweight calcium carbonate, with fineness of greater than 200 meshes.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties. However, for eutrophic areas, substances containing nitrogen and phosphorus elements are not selected.

Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, the chopped fibers are inorganic fibers (12-20 mm in length) and comprise one or more of basalt fibers, alkali-resistant glass fibers and carbon fibers.

Additionally or Alternatively, the lightweight coarse aggregate is one or two of crushed lightweight porous basalt and lightweight ceramsite of which the maximum particle size is less than 20 mm.

Additionally or Alternatively, and the lightweight fine aggregate is one or two of crushed zeolite and lightweight ceramic sand, with a particle size of 0.2 to 5 mm.

A preparation method of a concrete settlement substrate with a rough surface for oyster is characterized by comprising the following steps:

S1, designing different roughness according to the characteristic that oyster larvae prefer to settle or adhere to/on the rough surface, and then manufacturing moldings with different roughness;

S2, weighing a cementitious material, lightweight coarse aggregate, lightweight fine aggregate, water, a dark pigment, biological calcium powder, calcium carbonate powder, trace elements, chopped fibers and a superplasticizer;

S3, firstly putting the lightweight coarse aggregate and the lightweight fine aggregate into a concrete mixer to be mixed for 0.5-1 min; then adding the cementitious material, the dark pigment, the biological calcium powder, the calcium carbonate powder and the trace elements, and continuously mixing for 1-2 min; then adding the chopped fibers, the water and the superplasticizer, and mixing for 2-6 min; then carrying out casting and consolidating after uniformly mixing; and S4, putting a concrete sample after demolding into a high-concentration $CO_2$ curing chamber for curing for 0.5-5 h according to the situation so as to reduce the alkalinity of the concrete sample, and then carrying out standard curing for 28 d or curing according to the actual situation.

Thus, the concrete settlement substrate with the rough surface for oyster and a good induction effect is made.

An objective of the present disclosure is to provide a marine ecological engineering construction method. Through the method, a marine engineering can be constructed, oysters can be quickly and compactly settled to the surface of the marine engineering, the durability of the marine engineering can be improved, the oysters are used as ecological engineers to purify water and restore ecology, and high ecologicalization of the marine engineering can be achieved.

The present disclosure is achieved as that: the construction method comprises the following steps:

(1) surveying a sea area of an ecological engineering construction position;

(2) preparing a concrete settlement substrate;

(3) collecting and cultivating oyster larvae in a routine and quantitative way;

(4) designing a concrete member;

(5) manufacturing the concrete member;

(6) placing concrete samples;

(7) placing the oyster settlement substrate on site; and (8) monitoring and managing the larva settlement.

The specific technical solution is as follows:

The surveying of the sea area of the ecological engineering construction position in the step (1) comprises the step of surveying dominant species of oysters in the sea area and whether the oysters are settled, surveying air temperature, seawater temperature, dissolved oxygen, plankton, total dissolved inorganic nitrogen, active phosphate, active silicate, $Ca^{2+}$, $Zn^{2+}$, $K^+$ and the like for the sea area at different seasons, and surveying typhoon times, strength and the like over the years.

The manufacturing of the concrete settlement substrate in the step (2) comprises the step of preparing a lightweight concrete settlement substrate with a rough surface for oyster, wherein the shape of the concrete settlement substrate for oyster is one of the shapes of a slab-shaped settlement substrate, a wave-shaped settlement substrate and a cylindrical settlement substrate.

The regularly and quantitatively collecting and cultivating of the oyster larvae in the step (3) comprises the step of placing the settlement substrate in a larva collection area of a nearby sea area in the concentration period of settlement and metamorphosis of oyster planktonic larvae in the local sea area, stopping collecting the larvae when the amount of settled oyster larvae is 15-25 larvae/100 $cm^2$, and then moving the settlement substrate to a sea area with rich baits for floating cultivation.

The designing of the concrete member in the step (4) comprises the step of performing ecological engineering concrete member configuration design by considering the influence of oyster settlement on the environment and wave absorption, wherein in order to increase the settlement quantity of oysters as much as possible and provide space for other organisms, a thin-wall and multi-opening member is adopted, the internal voidage is more than 40%, multiple inclined columns are arranged on the member, and the size of the member is 0.5-15 cm3.

The manufacturing of the concrete member in the step (5) comprises the step of manufacturing the member with a special shape, in particular a groove structure with a large inside and a small outside, by fiber-reinforced ecological concrete with significant inductive effect for marine sessile organism and through an elastic mold; and determining the curing method according to the concrete mixture proportions and the alkalinity and the impermeability.

The placing of the concrete samples in the step (6) comprises the step of in the concentration period of settlement and metamorphosis of the oyster planktonic larvae in the local sea area of the next year, adopting a dispersed placement method, considering the interaction of a plurality of samples, and connecting the concrete samples by or adopt ropes.

The placing of the oyster settlement substrate on site in the step (7) comprises the step of conveying the oyster settlement substrate on which the gonad of oysters develops into mature stage to the sea area for constructing the marine ecological engineering, placing one lightweight concrete settlement substrate with the rough surface for oyster on each member and fixing the lightweight concrete settlement substrate for oyster on the concrete member through ropes; in addition, feeding algae or replenishing nutritive salts if necessary according to the planktonic condition of the local sea area.

The monitoring and managing the state of the larva settlement in the step (8) comprise the step of monitoring the settlement condition of the oyster larvae on the concrete surface; when the larva settlement density is 30 to 40 larvae/100 cm2, moving away the lightweight concrete settlement substrate with the rough surface for oyster, monitoring the ecological condition of a breakwater for a long time, and providing improvement measures according to the actual condition.

The concentration period of settlement and metamorphosis of the oyster planktonic larvae in the step (6) is generally May to August in the north and is generally April to October in the south.

The internal voidage of the thin-wall and multi-opening member in the step (4) is more than 40-90%, and multiple inclined columns are arranged on the thin-wall and multi-opening member; the thin-wall and multi-opening member comprises a base, a thin-wall hollow concrete shell is connected to the base, and at least six concrete rod members are arranged on the shell. The shell can be a sphere or a plate; and the concrete rod members can be discs or plates.

A concrete curing method as described in the specific measure in the step (5) is that a concrete curing method adopted is that a curing method and a curing time of the concrete are determined according to the concrete mix; for the concrete prepared by Portland cement, CO2 curing is adopted, and the curing time is 0.5-5 h.

Round holes with the diameter of 3-5 mm are reserved in the cement-based ecological settlement substrate as described in the specific measure in the step (2) during molding, and the size of the slab-shaped settlement substrate is 10×10×2-3 cm.

The rope as described in the specific measure in the step (7) is one of a coir rope, a glass fiber rope and a basalt fiber rope.

The lightweight concrete settlement substrate with the rough surface as described in the specific measure in the step (2) comprises the following material components in percentage by weight: 21.8-34.5% of the cementitious material, 24.6-37.5% of lightweight coarse aggregate, 15.8-29.6% of lightweight fine aggregate, 8.4-16.4% of water, 0.6-3.0% of the dark pigment, 0.4-2.0% of biological calcium powder, 0.4-2.0% of calcium carbonate powder, 0.2-1.8% of trace elements, 0.15-1.5% of chopped fibers and 0.03-0.18% of the superplasticizer.

Additionally or Alternatively, the dark pigment is one or two of iron oxide black, nigrosine, carbon black, antimony sulfide, iron oxide red and organic pigment red.

Additionally or Alternatively, the above dark pigments are modified according to the influence degree on the concrete properties; and one of transparent resin, organosilicon, dimethylsiloxane and a superhydrophobic material is used for modification treatment.

Additionally or Alternatively, the biological calcium powder is bovine bone powder, and the biological calcium carbonate powder comprises one or more of oyster shell powder, fishbone powder, egg shell powder and coral powder, with fineness of 100-1,000 meshes.

Additionally or Alternatively, the biological calcium powder is obtained by treating the 100-500-mesh egg shell powder, coral powder, oyster shell powder and fishbone powder with one or two of acetic acid, acetic acid aqueous solution, silicic acid and sulfurous acid, and by treating the 100-500-mesh bovine bone powder with one or two of diluted phosphoric acid, sulfuric acid, hydrochloric acid and nitric acid.

Additionally or Alternatively, the calcium carbonate powder is calcite powder, chalk powder, limestone powder, marble powder, aragonite powder, travertine powder, and one or more of processed lightweight calcium carbonate, active calcium carbonate, calcium carbonate whiskers and ultrafine lightweight calcium carbonate, with fineness of greater than 200 meshes.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete properties. However, for eutrophic areas, substances containing nitrogen and phosphorus elements are not selected.

Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, the chopped fibers are inorganic fibers (12-20 mm in length) and comprise one or more of basalt fibers, alkali-resistant glass fibers and carbon fibers.

Additionally or Alternatively, the lightweight coarse aggregate is one or two of crushed lightweight porous basalt and lightweight ceramsite of which the maximum particle size is less than 20 mm.

Additionally or Alternatively, and the lightweight fine aggregate is one or two of crushed zeolite and lightweight ceramic sand, with a particle size of 0.2 to 5 mm.

A preparation method of a concrete settlement substrate for oyster comprises the following steps:

S1, designing different roughness according to the characteristic that oyster larvae prefer to settle to rough substrate surface, and then manufacturing moldings with different roughness;

S2, weighing a cementitious material, lightweight coarse aggregate, lightweight fine aggregate, water, a dark pigment, biological calcium powder, calcium carbonate powder, trace elements, chopped fibers and a superplasticizer;

S3, firstly putting the lightweight coarse aggregate and the lightweight fine aggregate into a concrete mixer to be mixed for 0.5-1 min; then adding the cementitious material, the dark pigment, the biological calcium powder, the calcium carbonate powder and the trace elements, and continuously mixing for 1-2 min; then adding the chopped fibers, the water and the superplasticizer, and mixing for 2-6 min; then carrying out casting and consolidating after uniformly mixing; and S4, putting a concrete sample after demolding into a high-concentration CO2 curing chamber for curing for 0.5-5 h according to the situation so as to reduce the alkalinity of the concrete sample, and then carrying out standard curing for 28 d or curing according to the actual situation.

Thus, the concrete settlement substrate with the rough surface for oyster and a good induction effect can be prepared.

The fiber-reinforced ecological concrete as described in the special measure in the step (5) is specifically prepared from, by weight, 12.5-22.0% of the cementitious material, 39.4-49.8% of crushed stone, 24.9-37.3% of sand, 6.2-8.7% of water, 0.2-1.7% of the dark pigment, 0.15-1.0% of biological calcium powder, 0.15-1.0% of calcium carbonate powder, 0.1-1.0% of trace elements, 0.1-1.0% of chopped fibers and 0.02-0.1% of the superplasticizer.

The fiber-reinforced ecological concrete as described in the special measure in the step (5) is prepared from the following raw materials:

Additionally or Alternatively, the dark pigment is one or two of iron oxide black, nigrosine, carbon black, antimony sulfide, iron oxide red and organic pigment red. The above pigments are modified according to the influence degree on the concrete properties; and one of transparent resin, organosilicon, dimethylsiloxane and a superhydrophobic material is used for modification treatment.

Additionally or Alternatively, the biological calcium powder is bovine bone powder; and the biological calcium carbonate powder comprises one or a combination of more of oyster shell powder, fishbone powder, egg shell powder and coral powder, with fineness of 100-1,000 meshes.

Additionally or Alternatively, the biological calcium powder is modified by a method for treating the 100-500-mesh egg shell powder, coral powder, oyster shell powder and fishbone powder with one or two of acetic acid, silicic acid and sulfurous acid, and treating the 100-500-mesh bovine bone powder with one or two of diluted phosphoric acid, sulfuric acid, hydrochloric acid and nitric acid.

Additionally or Alternatively, the calcium carbonate powder is calcite powder, chalk powder, limestone powder, marble powder, aragonite powder, travertine powder, and one or more of processed lightweight calcium carbonate, active calcium carbonate, calcium carbonate whiskers and ultrafine lightweight calcium carbonate, with fineness of greater than 200 meshes.

Additionally or Alternatively, the trace elements that are zinc, iron, potassium and phosphorus are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate, and are modified to realize slow release of corresponding ions and to reduce or eliminate adverse effects on the concrete performance. However, for eutrophic areas, substances containing nitrogen and phosphorus elements are not selected.

Additionally or Alternatively, the chopped fibers are inorganic fibers (12-40 mm in length) and comprise one or more of basalt fibers, alkali-resistant glass fibers and carbon fibers.

Additionally or Alternatively, the cementitious material is one of mineral admixture added Portland cement, sulphoaluminate cement and an alkali-activated cementitious material. The mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash.

Additionally or Alternatively, sand is one or more of river sand, machine-made sand (basalt or granite as parent rock) or desalinated sea sand.

A preparation method of the fiber-reinforced ecological concrete comprises the following steps:

S1, accurately weighing a cementitious material, crushed stone, sand, water, a dark pigment, biological calcium powder, calcium carbonate powder, trace elements, chopped fibers and a superplasticizer; and S2, firstly, putting the crushed stone and the sand into a concrete mixer for mixing for 0.5-1 min; then adding the cementitious material, the dark pigment, the biological calcium powder, the calcium carbonate powder and the trace elements, and continuously mixing for 0.5-1 min; then adding the chopped fibers, the water and the superplasticizer, and mixing for 3-8 min; after uniform mixing, casting, consolidating, and then performing standard curing for 28 d or curing according to actual conditions to obtain the fiber-reinforced ecological concrete.

The fiber-reinforced ecological concrete as described in the specific measure in the step (5) comprises the following raw materials in percentage by weight: 0.2-1.7% of the dark pigment, 12.5-22.0% of the cementitious material, 39.4-49.8% of crushed stone, 24.9-37.3% of sand, 6.2-8.7% of water and 0.02-0.1% of the superplasticizer.

The fiber-reinforced ecological concrete as described in the specific measure in the step (5) comprises the following raw materials in percentage by weight: 0.15-1.37% of bovine bone powder, 12.5-22.0% of a cementitious material, 39.4-49.8% of crushed stone, 24.9-37.3% of sand, 6.2-8.7% of water and 0.02-0.1% of a superplasticizer.

The fiber-reinforced ecological concrete as described in the specific measure in the step (5) comprises the following raw materials in percentage by weight: 0.15-1.37% of calcium carbonate powder, 12.5-22.0% of a cementitious material, 39.4-49.8% of crushed stone, 24.9-37.3% of sand, 6.2-8.7% of water and 0.02-0.1% of a superplasticizer.

The present disclosure has the beneficial effects that:

in the present disclosure, a diluted acid modification technology and a composite grinding technology are adopted in a control way, the induction capability of the bovine bone powder is fully exerted, the dosage of the bovine bone powder is greatly reduced, and anti-corrosion treatment and modification are carried out, so that a composite inducer taking the bovine bone powder as a main component is realized, the dosage of the composite inducer is small, the strength and permeability of concrete are hardly influenced, meanwhile, the composite inducer has significant inductive effect on larval settlement, and the problem of mildewing of the concrete is solved. Compared with concrete without the inducer, the concrete with the inducer enables the number of settled oyster larvae to be obviously increased.

The present disclosure constructs the marine engineering, more oysters can be compactly settled to the marine engineering, thus the durability of the marine engineering can be improved; and based on the characteristics that the oysters are used as ecological engineers and can purify water bodies and improve the water areas, high ecologicalization of the marine engineering can be realized.

Therefore, the above knowledge related to crossing of the marine sessile organism discipline, marine plants and marine concrete engineering disciplines, and technicians in the fields of concrete and engineering or the field of marine organisms could not obtain the technical characteristics of close correlation between the technology of mixing the dark pigment into the concrete to change the color, the technology of modifying the bovine bone powder, the technology of grinding and the technology of controlling the permeability of the concrete and the concrete with the capability of efficiently inducing the settlement of the oysters and high durability from the comparison documents 2-3. The technicians also cloud not obtain the technical characteristics of close correlation between the balance between the reduction of the alkalinity of the concrete and the concentration of calcium ions and settlement of the marine sessile organisms from the comparison document 4.

Although examples of the present disclosure have been shown and described, it would be understood by those skilled in the art that various changes, modifications, and substitutions could be made in these embodiments without departing from the principle and spirit of the present disclosure and modifications, the scope of the present disclosure is defined by the appended claims and their equivalents.

The invention claimed is:

1. A marine ecological engineering construction method, comprising the following steps:

(1) surveying a sea area, the surveying comprising determining dominant species of oysters in the sea area and whether the oysters are settled, measuring air temperature, seawater temperature, dissolved oxygen, plankton, total dissolved inorganic nitrogen, active phosphate, active silicate, $Ca^{2+}$, $Zn^{2+}$, and $K^{+}$ for the sea area at different seasons, and determining historical typhoon, and strength;

(2) preparing a lightweight concrete settlement substrate with a rough surface for oyster settlement, wherein a shape of the lightweight concrete settlement substrate is selected from shapes of the following substrates: a slab-shaped settlement substrate, a wave-shaped settlement substrate and a cylindrical settlement substrate;

(3) collecting and cultivating oyster larvae by placing the lightweight concrete settlement substrate in a larva collection area of a sea area, wherein swimming oyster larvae are mainly in metamorphosis period, ceasing collection of the swimming oyster larvae once an amount of settled oyster larvae on the lightweight concrete settlement substrate is 15-25 larvae/100 $cm^2$, and then moving the lightweight concrete settlement substrate to another sea area that is rich in baits for floating cultivation;

(4) designing a thin-wall and multi-opening concrete member, wherein the internal voidage of the thin-wall and multi-opening concrete member is more than 40%, multiple inclined columns are arranged on the thin-wall and multi-opening concrete member, and the size of the thin-wall and multi-opening concrete member is 0.5-15 $m^3$;

(5) manufacturing the thin-wall and multi-opening concrete member with a groove structure with a large inside and a small outside, by molding a fiber-reinforced ecological concrete through an elastic mold;

(6) placing a plurality of the thin-wall and multi-opening concrete: in a subsequent concentration period of settlement and metamorphosis of oyster planktonic larvae in the sea area, adopting a dispersed placement method and connecting the plurality of thin-wall and multi-opening concrete members by ropes;

(7) placing the lightweight concrete settlement substrate in site by conveying the lightweight concrete settlement substrate from step (3) in which gonads of the oysters develop into a mature stage to the sea area for constructing the marine ecological engineering, placing one lightweight concrete settlement substrate on each thin-wall and multi-opening concrete member and fixing the lightweight concrete settlement substrate on the thin-wall and multi-opening concrete member through a rope and (8) monitoring and managing a settlement density of oyster larvae on a concrete surface of the thin-wall and multi-opening concrete member; and when the larval settlement density is 30 to 40 larvae/100 $cm^2$, moving away the lightweight concrete settlement substrate.

2. The marine ecological engineering construction method according to claim 1, wherein the fiber-reinforced ecological concrete is prepared from, by weight, 12.5-22.0% of a cementitious material, 39.4-49.8% of crushed stone, 24.9-37.3% of sand, 6.2-8.7% of water, 0.2-1.7% of a dark pigment, 0.15-1.0% of a biological calcium powder, 0.15-1.0% of a calcium carbonate powder, 0.1-1.0% of trace elements, 0.1-1.0% of chopped fibers and 0.02-0.1% of a superplasticizer.

3. The marine ecological engineering construction method according to claim 2, wherein: the dark pigment is one or two of iron oxide black, nigrosine, carbon black, antimony sulfide, iron oxide red and organic pigment red; wherein the dark pigment is modified with one of transparent resin, organosilicon, dimethylsiloxaneand a superhydrophobic material;

the biological calcium powder is bovine bone powder; and the calcium carbonate powder comprises one or a combination of more of oyster shell powder, fishbone-fish bone powder, egg shell powder and coral powder, with a fineness of 100-1,000 meshes;

the biological calcium powder is modified by a method comprising treating 100-500-mesh egg shell powder, coral powder, oyster shell powder and fish bone powder with one or two of acetic acid, silicic acid and sulfurous acid, and treating 100-500-mesh bovine bone powder with one or two of diluted phosphoric acid, sulfuric acid, hydrochloric acid and nitric acid;

the calcium carbonate powder is calcite powder, chalk powder, limestone powder, marble powder, aragonite powder, travertine powder, and one or more of processed lightweight calcium carbonate, active calcium carbonate, calcium carbonate whiskers and ultrafine lightweight calcium carbonate, with a fineness of greater than 200 meshes;

the trace elements are zinc, iron, potassium and phosphorus and are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate the chopped fibers are inorganic fibers (12-40 mm in length) and comprise one or more of basalt fibers, alkali-resistant glass fibers and carbon fibers;

the cementitious material is one of mineral admixture added Portland cement, sulphoaluminate cement and an alkali-activated cementitious material; the mineral admixture in the mineral admixture added Portland cement comprises one or a combination of more of silica fume, slag powder and fly ash; the sulphoaluminate cement comprises one or two of rapidhardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash; and the sand is one or more of river sand, manufactured sand or desalinated sea sand.

4. The marine ecological engineering construction method according to claim 1, wherein the thin-wall and multi-opening member comprises a base, a thin-wall hollow concrete shell connected to the base, and at least six concrete rod members arranged on the shell, and wherein the shell is a sphere or a plate; and wherein the concrete rod members are discs or plates.

5. The marine ecological engineering construction method according to claim 1, wherein the lightweight concrete settlement substrate is prepared from the following components in percentage by weight: 21.8-34.5% of a cementitious material, 24.6-37.5% of lightweight coarse aggregate, 15.8-29.6% of lightweight fine aggregate, 8.4-16.4% of water, 0.6-3.0% of a dark pigment, 0.4-2.0% of a biological calcium powder, 0.4-2.0% of a calcium carbonate powder, 0.2-1.8% of trace elements, 0.1-1.0% of chopped fibers and 0.03-0.15% of a superplasticizer.

6. The marine ecological engineering construction method according to claim 5, wherein the dark pigment is one or two of iron oxide black, nigrosine, carbon black, antimony sulfide, iron oxide red and organic pigment red; wherein the dark pigment is modified with one of transparent resin, organosilicon, dimethylsiloxane and a superhydrophobic material;

the biological calcium powder is bovine bone powder; the biological-calcium carbonate powder comprises one or a combination of more of oyster shell powder, fishbone powder, egg shell powder and coral powder, with a fineness of 100-1000 meshes; wherein prior to preparation of the lightweight concrete settlement substrate, 100-500-mesh egg shell powder, coral powder, oyster shell powder and fishbone powder are treated with one or two of acetic acid, silicic acid and sulfurous acid; and 100-500-mesh bovine bone powder is treated with one or two of diluted phosphoric acid, sulfuric acid, hydrochloric acid and nitric acid;

the calcium carbonate powder is calcite powder, chalk powder, limestone powder, marble powder, aragonite powder, travertine powder, and one or more of processed lightweight calcium carbonate, active calcium carbonate, calcium carbonate whiskers and ultrafine lightweight calcium carbonate, with a fineness of greater than 200 meshes;

the trace elements are zinc, iron, potassium and phosphorus and are selected from natural minerals, industrial products or chemical reagents, including one or more of zinc sulfate, calcium phosphate, zinc phosphate, potassium sulfate, potassium nitrate, ferric sulfate, ammonium nitrate, potassium phosphate, ammonium phosphate and ferric phosphate the cementitious material is one of mineral admixture added Portland cement, sulphoaluminate cement and an alkali-activated cementitious material; the mineral admixture in the mineral admixture added Portland cement comprises one or a combination of more of silica fume, slag powder and fly ash; the sulphoaluminate cement comprises one or two of rapid hardening sulphoaluminate cement, high-strength sulphoaluminate cement and expansive sulphoaluminate cement; and the alkali-activated cementitious material comprises one of alkali-activated slag powder, and a combination of alkali-activated slag powder and fly ash; and the lightweight coarse aggregate is one or two of crushed lightweight porous basalt and lightweight ceramsite of which the maximum particle size is less than 20 mm;

the lightweight fine aggregate is one or two of crushed zeolite and lightweight ceramic sand, with a particle size of 0.2 to 5 mm;

the chopped fibers are inorganic fibers and comprise one or more of basalt fibers, alkali-resistant glass fibers and carbon fibers;

wherein a preparation method for the lightweight concrete settlement substrate comprises the following steps:

manufacturing molding formworks with different roughness;

weighing the cementitious material, the lightweight coarse aggregate, the lightweight fine aggregate, the water, the dark pigment, the biological calcium powder, the calcium carbonate powder, the trace elements, the chopped fibers and the superplasticizer;

firstly putting the lightweight coarse aggregate and the lightweight fine aggregate into a concrete mixer to be mixed for 0.5-1 min; then adding the cementitious material, the dark pigment, the biological calcium powder, the calcium carbonate powder and the trace elements, and continuously mixing for 1-2 min; then adding the chopped fibers, the water and the superplasticizer, and mixing for 2-6 min; then carrying out casting and consolidating after uniformly mixing; and putting a concrete sample after demolding into a high-concentration $CO_2$ curing chamber for curing for 0.5-5 h and then carrying out standard curing for 28 d.

7. The marine ecological engineering construction method according to claim 1, wherein the subsequent concentration period of settlement and metamorphosis of oyster planktonic larvae is May to August or April to October.

8. The marine ecological engineering construction method according to claim 1, further comprising curing the thin-wall and multi-opening concrete member with $CO_2$ for 0.5-5 h; and subsequently subjecting the thin-wall and multi-opening concrete member to standard curing for 28 d.

9. The marine ecological engineering construction method according to claim 1, wherein the lightweight concrete settlement substrate is prepared from the following raw materials in percentage by weight: 0.2-1.7% of a dark pigment, 12.5-22.0% of a cementitious material, 39.4-49.8% of crushedstone, 24.9-37.3% of sand, 6.2-8.7% of water and 0.02-0.1% of a superplasticizer.

10. The marine ecological engineering construction method according to claim 1, wherein the lightweight concrete settlement substrate is prepared from the following raw materials in percentage by weight: 0.15-1.37% of bovine bone powder, 12.5-22.0% of a cementitious material, 39.4-49.8% of crushed stone, 24.9-37.3% of sand, 6.2-8.7% of water and 0.02-0.1% of a superplasticizer.

11. The marine ecological engineering construction method according to claim 1, wherein the lightweight concrete settlement substrate is prepared from the following raw materials in percentage by weight: 0.15-1.37% of calcium carbonate powder, 12.5-22.0% of a cementitious material, 39.4-49.8% of crushed stone, 24.9-37.3% of sand, 6.2-8.7% of water and 0.02-0.1% of a superplasticizer.

12. The marine ecological engineering construction method according to claim 1, wherein the lightweight concrete settlement substrate is prepared from the following raw materials in percentage by weight: 0.2-1.8% of trace elements, 12.5-22.0% of a cementitious material, 39.4-49.8% of crushed stone, 24.9-37.3% of sand, 6.2-8.7% of water and 0.02-0.1% of a superplasticizer.

* * * * *